United States Patent
Pszolla et al.

(10) Patent No.: US 12,388,112 B2
(45) Date of Patent: Aug. 12, 2025

(54) RECHARGEABLE BATTERY CELL WITH ACTIVE ELECTRODE DEPOLARIZER

(71) Applicant: Innolith Technology AG, Basel (CH)

(72) Inventors: Christian Pszolla, Karlsruhe (DE); Vishwanathan Ramar, Heidelberg (DE); Laurent Zinck, Mothern (FR); Markus Borck, Stuttgart (DE)

(73) Assignee: Innolith Technology AG, Basel (CH)

( * ) Notice: Subject to any disclaimer, the term of this patent is extended or adjusted under 35 U.S.C. 154(b) by 515 days.

(21) Appl. No.: 16/739,894

(22) Filed: Jan. 10, 2020

(65) Prior Publication Data

US 2020/0280092 A1  Sep. 3, 2020

(51) Int. Cl.
*H01M 10/0525* (2010.01)
*H01M 4/136* (2010.01)
*H01M 10/0563* (2010.01)

(52) U.S. Cl.
CPC ........ *H01M 10/0525* (2013.01); *H01M 4/136* (2013.01); *H01M 10/0563* (2013.01)

(58) Field of Classification Search
CPC ......... H01M 10/0563; H01M 10/0525; H01M 4/136; H01M 4/133; H01M 10/0562; H01M 10/058; H01M 10/4235; H01M 4/623; H01M 4/661; H01M 4/808; H01M 2300/002; Y02E 60/10; Y02P 70/50
See application file for complete search history.

(56) References Cited

U.S. PATENT DOCUMENTS

| | | | | |
|---|---|---|---|---|
| 4,316,777 A | * | 2/1982 | Dey | H01M 10/36 429/219 |
| 4,752,541 A | * | 6/1988 | Faulkner | C25C 1/02 429/105 |
| 9,263,745 B2 | | 2/2016 | Zinck et al. | |
| 2011/0287304 A1 | | 11/2011 | Zinck et al. | |
| 2013/0040188 A1 | | 2/2013 | Zinck et al. | |
| 2013/0189566 A1 | | 7/2013 | Zinck et al. | |

(Continued)

FOREIGN PATENT DOCUMENTS

| | | | | |
|---|---|---|---|---|
| CN | 105723546 A | * | 6/2016 | ........ H01M 10/0525 |
| DE | 30 37 060 A1 | | 4/1981 | |

(Continued)

OTHER PUBLICATIONS

Walker et al., Optimization of Carbon Cathodes for Li/SO2Cl2 Cells, 1984, J. Electrochem. Soc., 132, 1536-1539 (Year: 1984).*

(Continued)

*Primary Examiner* — Daniel S Gatewood
(74) *Attorney, Agent, or Firm* — Bose McKinney & Evans LLP

(57) ABSTRACT

Rechargeable battery cells are provided in which electrolyte comprises $SO_2$ and a conductive salt, wherein upon discharge a reaction product is produced at the positive electrode. The rechargeable battery cells can comprise carbon and a conducting element having a three-dimensional porous metal structure, and can include optional components such (Continued)

as a metal oxide that catalyzes at least one reduction reaction at the cathode upon discharge and/or a metal halide. Methods of making and using such rechargeable battery cells are provided.

7 Claims, 6 Drawing Sheets

(56) References Cited

U.S. PATENT DOCUMENTS

| | | | | |
|---|---|---|---|---|
| 2014/0023940 | A1* | 1/2014 | Zaghib | H01M 4/382 |
| | | | | 429/405 |
| 2015/0093632 | A1 | 4/2015 | Pszolla et al. | |
| 2016/0372807 | A1* | 12/2016 | Kim | H01M 4/9083 |
| 2017/0194650 | A1* | 7/2017 | Mihara | H01B 1/04 |
| 2018/0090786 | A1 | 3/2018 | Jeong et al. | |

FOREIGN PATENT DOCUMENTS

| | | |
|---|---|---|
| EP | 2 742 551 A2 | 6/2014 |
| EP | 3 435 448 A1 | 1/2019 |
| GB | 2 412 484 A | 9/2005 |
| JP | S 63-236276 A | 10/1988 |
| JP | 2001-013015 A | 1/2001 |
| JP | 2008-508672 A | 3/2008 |
| JP | 2013-519968 A | 5/2013 |
| JP | 2016-532279 A | 10/2016 |
| JP | 2018-056107 A | 4/2018 |
| KR | 10-2013-0006614 A | 1/2013 |
| KR | 10-2016-0032775 A | 3/2016 |
| KR | 10-2018-0020631 | 2/2018 |
| KR | 10-2018-0020631 A | 2/2018 |
| KR | 10-1899212 B1 | 9/2018 |
| RU | 2 574 592 C2 | 10/2015 |

OTHER PUBLICATIONS

Dey et al., Inorganic Electrolyte Li/ SO2 Rechargeable System: Development of a Prototype Hermetic C Cell and Evaluation of Its Performance and Safety Characteristics, Journal of The Electrochemical Society, 1988, vol. 135, No. 9, pp. 2115-2120.

Schweiss et al., Sigracet® Gas Diffusion Layers for PEM Fuel Cells, Electrolyzers and Batteries (White Paper), Feb. 2016, 11 pages.

La Triveneta Cavi, What are lithium-air batteries and how do they work?, The Blog, Jul. 8, 2016, https://blog.latrivenetacavi.com/en/what-are-lithium-air-batteries-and-do-they-work/, 4 pages.

Takehara, Batteries and Power, Denki Kagaku, 1980, vol. 48, No. 12, pp. 644-651.

Takahashi, Batteries and Their Materials Chemistry—Materialization of Chemical Batteries, Chemical Education, 1981, vol. 29, No. 4, pp. 278-283.

Park et al., Influence of the Electrode Materials on the Electrochemical Performance of Room Temperature Li—SO2 Rechargeable Battery, International Journal of Electrochemical Science, 2015, vol. 10, pp. 7574-7581.

* cited by examiner

RECHARGEABLE BATTERY CELL WITH ACTIVE ELECTRODE DEPOLARIZER

RELATED APPLICATIONS

This application claims priority to EP 19 159 989.3, filed Feb. 28, 2019, the entire disclosure of which is hereby incorporated herein by reference.

BACKGROUND

The disclosure relates to rechargeable battery cells comprising sulfur dioxide ($SO_2$)-based electrolyte that serves as an active electrode depolarizer.

Rechargeable battery cells are of major importance in many technical areas. They are often used for applications in which only relatively low current intensity is required, such as mobile phones. There is also a great demand for battery cells in high current applications, where mass storage of energy is of particular importance.

An important attribute of a rechargeable battery cell is its energy density. Ideally, a rechargeable battery cell should contain as much electrical energy as possible per unit of weight and volume. Lithium as an active metal has proven to be particularly beneficial for this purpose. The active metal of a rechargeable battery cell is the metal whose ions within the electrolyte migrate to the negative or positive electrode when the cell is charged or discharged, where they participate in electrochemical processes. These electrochemical processes lead directly or indirectly to the release of electrons into the external circuit or to the absorption of electrons from the external circuit. Rechargeable battery cells containing lithium as an active metal are also referred to as lithium ion cells.

Both the positive and negative electrodes of lithium ion cells are designed as insertion electrodes. The term 'insertion electrode' in the sense of this disclosure refers to electrodes which have a crystalline structure into which ions of the active material can be stored and removed during operation of the lithium ion cell. This means that electrode processes can take place not only on the surface of the electrodes, but also within their crystalline structure. The negative electrode of a conventional lithium ion cell that comprises an organic electrolyte may, for example, comprise a carbon coating that is applied to a conducting element, e.g., comprising copper. The conducting element is an electrically conducting material that provides the electrical connection needed to create an external circuit. The positive electrode may comprise, for example, lithium cobalt oxide ($LiCoO_2$) that is applied to an aluminum conducting element. Both electrodes generally can have a thickness of less than 100 μm and are therefore typically very thin. When the lithium ion cell is charged, the ions of the active metal are removed from the positive electrode and stored in the negative electrode. When the lithium ion cell is discharged, the reverse process occurs.

The ions are transported between the electrodes by means of the electrolyte, which ensures the required ion mobility. State-of-the-art lithium ion cells typically contain an electrolyte consisting of a conductive salt dissolved in an organic solvent or solvent mixture. The conductive salt is a lithium salt such as lithium hexafluorophosphate ($LiPF_6$). The solvent mixture can, for example, contain ethylene carbonate. Due to the organic solvent or solvent mixture, such lithium ion cells are also referred to as organic lithium ion cells.

Organic lithium-ion cells can experience problems in terms of stability and long-term operational reliability. Safety risks are caused in particular by the combustibility, i.e., flammability, of the organic solvent or solvent mixture. When an organic lithium ion cell catches fire or even explodes, the organic solvent of the electrolyte forms a combustible material. In order to avoid such safety risks, additional measures must be taken. These measures typically include a highly precise regulation of the charging and discharging processes of the organic lithium-ion cell as well as an optimized battery design. Moreover, the organic lithium-ion cell contains components that can melt during unintentional temperature increase and flood the organic lithium-ion cell with molten plastic. The flooding does prevent a further uncontrolled rise in temperature. These safety measures, however, lead to higher production costs and an increase in volume and weight of the organic lithium-ion cell. They also can reduce its energy density. The issues of stability and long-term reliability described above become even more problematic when battery cells are to be developed for high energy applications.

Some rechargeable battery cells employ an electrolyte based on sulfur dioxide ($SO_2$) instead of an organic electrolyte. Rechargeable battery cells that contain an electrolyte based on $SO_2$ have a high ionic conductivity because of their ability to dissolve a large amount of conductive salt. The term "$SO_2$-based electrolyte" is used in the context of this disclosure to designate an electrolyte that contains $SO_2$ in a concentration that is sufficient to permit mobility of the ions in the conductive salt that is contained in the electrolyte, which ions are responsible for charge transport. $SO_2$-based electrolytes have the advantage of non-combustibility compared to the organic electrolytes described above. Safety risks due to the flammability of the electrolyte can thus be reduced or substantially eliminated.

Examples of rechargeable batteries that employ $SO_2$ are provided in EP 2 534 719 B1, which discloses a rechargeable battery cell with a housing, a positive electrode, a negative electrode and an electrolyte. The electrolyte of this rechargeable battery cell is based on $SO_2$ and contains a conductive salt. An active material of the positive electrode, which is at least partially responsible for the energy storage in this rechargeable battery cell, can comprise a lithium metal oxide, or a lithium metal phosphate such as lithium iron phosphate ($LiFePO_4$). With this rechargeable battery cell, a specific capacity of, for example, 155 mAh/g can be achieved with a 1C discharge rate. At a discharge rate of 1C, by definition, the nominal capacity of a cell is discharged in one hour.

In certain types of rechargeable battery cells that contain the $SO_2$-based electrolyte as well as lithium metal phosphate or lithium metal oxide as active material of the positive electrode, the $SO_2$ can serve not only as a component of the electrolyte, but together with the conductive salt, the $SO_2$ can serve as a reactive component that may be referred to as an "active electrode depolarizer." By active electrode depolarizer, it is meant that $SO_2$ of the electrolyte undergoes a reduction reaction during discharge, which in turn leads to one or more reactions in which one or more discharge products are formed and deposited at the positive electrode. Other components in the electrolyte also may undergo a reduction reaction and/or other chemical reactions upon discharge. Upon charging, one or more of the discharge products begin to disappear and the reduced $SO_2$ is oxidized back to its original state. Other components in the electrolyte also may be oxidized during charging. In this disclosure, rechargeable battery cells in which the $SO_2$ acts not only as an electrolyte but also is reduced during discharge and re-oxidized during charging back to its original state are referred to as "$SO_2$ depolarizer battery cells." "Discharge product" as used herein means a product that is formed by a reaction that occurs following the reduction of $SO_2$ and other components of the electrolyte during discharge. Accordingly, $SO_2$ depolarizer battery cells can eliminate or reduce the need to use an additional active material for the positive electrode, for example lithium metal phosphate or lithium metal oxide. This can improves the manufacturability of the rechargeable battery cell and reduce production costs.

One example of an $SO_2$ depolarizer battery cell is provided in Dey et al., "Inorganic electrolyte $Li/SO_2$ rechargeable system: development of a prototype hermetic C cell and evaluation of its performance and safety characteristics." J. Electrochem. Soc. 135, 2115-2120 (1988). The $SO_2$ depolarizer battery cell reported in Dey et al., which employed an $SO_2$-based electrolyte comprising $LiAlCl4 \cdot 6\ SO_2$ in a rechargeable $Li$—$SO_2$ battery cell prototype in C-size, showed an energy density of 134 Wh/kg and a theoretical capacity of the $SO_2$-based electrolyte of approximately 144 mAh/g.

SUMMARY

Aspects of the present disclosure provide rechargeable $SO_2$ depolarizer battery cells that provide one or more of the following properties:
  good electrical performance data, in particular high energy density and reduced self-discharge;
  an increased service life, in particular a high number of usable charging and discharging cycles;
  reduced total weight;
  increased operational safety, including under more challenging conditions that may be encountered, e.g., wide temperature ranges from very cold (e.g., 0° F.) to very hot (e.g., 100° F.), and potential damage to the battery that can result in the contents of the cell being exposed to air and potentially an open flame, e.g., from automobile collisions;
  reduced production costs in terms of the raw materials required and the production process, including because the carbon required for the cathode is relatively inexpensive compared to the electrode materials that otherwise would be used; and
    improved stability during overcharge and deep discharge conditions.

One advantageous feature of the rechargeable $SO_2$ depolarizer battery cells disclosed herein is the high conductivity of their $SO_2$-based electrolyte (approx. 0.1 S/cm at room temperature). This excellent conductivity allows for good battery ratings or performance of rechargeable $SO_2$ depolarizer battery cells, for example low resistance and fast charging capability.

The rechargeable battery cells described herein also should be suitable for high-energy applications. Rechargeable high-energy battery cells in the sense of this disclosure can have a specific capacity of more than 500 mAh/g, preferably more than 750 mAh/g and more preferably more than 1000 mAh/g. The energy densities of high-energy cells described herein can be at least 150 Wh/kg, at least 200 Wh/kg, at least 250 Wh/kg, at least 300 Wh/kg, at least 500 Wh/kg, at least 600 Wh/kg, at least 700 Wh/kg, at least 800 Wh/kg, at least 900 Wh/kg, at least 1000 Wh/kg, about 1500 Wh/kg or greater than 1500 Wh/kg. Within these amounts are ranges of from 150-300 Wh/kg; 300-500 Wh/kg, 400-600 Wh/kg, 500-750 Wh/kg, 750-1000 Wh/kg, 1000-1500 Wh/kg, above 1500 Wh/kg, from about 150-300 Wh/kg; about 300-500 Wh/kg, about 400-600 Wh/kg, about 500-750 Wh/kg, about 750-1000 Wh/kg, about 1000-1500 Wh/kg, and above about 1500 Wh/kg 150 Wh/kg, about 200 Wh/kg, about 250 Wh/kg, about 300 Wh/kg, about 500 Wh/kg, about 600 Wh/kg, about 700 Wh/kg, about 800 Wh/kg, about 900 Wh/kg, and about 1000 Wh/kg. Unless otherwise indicated, the word "about" when referring to numeric values herein means a range of ±10% of the stated value. When "about" is used to describe a range, it is intended to modify both ends of the range, i.e., "about 150-300 Wh/kg" means the range of from about 150 Wh/kg to about 300 Wh/kg.

Typically, an $SO_2$ depolarizer battery cell comprises a housing, at least one positive electrode, at least one negative electrode, and an $SO_2$-based electrolyte. $SO_2$ depolarizer battery cells can have electrodes of the same or different thicknesses, e.g., the cathodes can have different thicknesses from the anodes, and/or the cathodes can be of varying thickness, and/or the anodes may be of varying thicknesses.

As described above, the $SO_2$ serves as an active material and is thus directly involved in the oxidation-reduction reactions that can take place reversibly and repeatedly in the rechargeable battery cell. As noted above, other components of the $SO_2$-based electrolyte also may undergo reversible oxidation-reduction reactions. Such reversible oxidation-reduction reactions can contribute to favorable rechargeability and long-term stability characteristics of the $SO_2$ depolarizer battery cell.

Optionally, an additional active material may be introduced into the positive electrode, for example lithium metal phosphate or lithium metal oxide. However, eliminating or reducing the use of such materials can improve the manufacturability of the $SO_2$ depolarizer battery cells described herein and reduces production costs. The use of such materials therefore may be avoided in the $SO_2$ depolarizer battery cells described herein.

The electrolyte in the in $SO_2$ depolarizer battery cells is substantially liquid, but can comprise solids. For example, the oxidation-reduction reaction taking place on the positive electrode during operation of the rechargeable battery cell can lead to the formation of solid reaction products that can precipitate and/or deposit on or in the positive electrode. These solid reaction products that deposit on the electrode can deposit on the surface of the positive electrode in the form of a film or a coating. As noted above, in addition to providing the $SO_2$ that is reduced during discharge, the $SO_2$-based electrolyte also enables charge transport between the electrodes and ensures ion mobility. For this purpose, the $SO_2$-based electrolyte contains an $SO_2$ concentration that is sufficiently high to enable mobility of the ions in the conductive salt that are contained in the electrolyte and provide the charge transport.

$SO_2$ depolarizer battery cells can comprise a housing, at least one positive electrode, at least one negative electrode, an $SO_2$-based electrolyte that serves as active electrode depolarizer, and one or more additional components that can facilitate and/or be involved in the reactions occurring during discharge and/or charging.

The $SO_2$ depolarizer battery cells can comprise one or more components that catalyze the formation of one or more discharge products from the $SO_2$-electrolyte during discharge and/or the re-formation of the $SO_2$ during charging. Where one or more catalytic components are desired, the positive electrode can comprise carbon and one or more chemical elements (or compounds containing the chemical element), typically in the form of a metal oxide, that can serves as a catalyst. The one or more catalytic chemical elements can comprise one or more metals selected from the group consisting of vanadium, nickel, copper, magnesium, manganese, titanium, aluminum, lead, palladium, tungsten, chromium, and combinations thereof. The additional chemical element(s) (or compound(s) containing the chemical element(s)) can be present in the positive electrode in a concentration of from 0.01 to 20 weight percent (weight %) or more based on the total weight of the carbon of the electrode. Within these ranges are ranges of 0.01-1 weight %, 1-5 weight %, 2.5-7.5 weight %, 5-10 weight %, 7.5-12.5 weight %, 10-15 weight %, 12.5-17.5 weight %, 15-20 weight %, greater than 20 weight %, about 0.01-1 weight %, about 1-5 weight %, about 2.5-7.5 weight %, about 5-10 weight %, about 7.5-12.5 weight %, about 10-15 weight %, about 12.5-17.5 weight %, about 15-20 weight %, and greater than about 20 weight %. The additional chemical element(s) or compound(s) can serve as a catalyst that supports or promotes the oxidation-reduction reactions and/or other reactions of the components of $SO_2$-based electrolyte on the positive electrode, which may enhance one or more performance characteristics of the $SO_2$ depolarizer battery cell. For example, the additional chemical element(s) or compound(s) that serve as a catalyst may be present as a coating on the electrode, which electrodes can contain, e.g., carbon. Alternatively, the additional chemical element(s) or compound(s) can form a mixture with the carbon that is used in the electrode. For example, in addition to carbon, the positive electrode may comprise a known redox catalyst of $SO_2$ such as vanadium oxide ($V_2O_5$). In such embodiments, the vanadium oxide can be present in an amount of from 1 to 5 weight %, from 2.5 to 7.5 weight %, from 5 to 10 weight %, from 7.5 to 12.5 weight %, from 10 to 15 weight %, from 12.5 to 17.5 weight %, from 15 to 20 weight %, greater than 20 weight %, about 0.01-1 weight %, about 1-5 weight %, about 2.5-7.5 weight %, about 5-10 weight %, about 7.5-12.5 weight %, about 10-15 weight %, about 12.5-17.5 weight %, about 15-20 weight %, and greater than about 20 weight %.

In aspects, the $SO_2$ depolarizer battery cells can comprise a positive electrode that has a conducting element with a three-dimensional porous metal structure in order to provide increased amounts of surface area, for example, a metal foam, fleece, lattice, matrix or mesh. As used herein, the term "three-dimensional porous metal structure" refers to any structure made of metal having a height, length and thickness, and which comprises pores, holes, openings, latticework, orifices, cavities, or other apertures (collectively "pores") that extend into and optionally through the thickness of the electrode to make available multiple surfaces that serve to increase the overall surface area of the electrode as compared to an electrode having the same exterior dimensions but instead having flat surfaces, i.e., without such pores. As mentioned above, optionally the pores of the three-dimensional porous metal structure can permit electrolyte to completely pass through the electrode, which may in turn provide advantageous electrolyte flow through the battery. Alternatively, the pores of the three-dimensional porous metal structure may not permit the passage of electrolyte completely through the electrode. The porous metal structure can comprise at least 10%, at least 20%, at least 30%, at least 40%, at least 50%, at least 60%, at least 70%, at least 80%, or at least 90% of the thickness of the positive electrode. The porous metal structure can comprise less than 80%, less than 70%, less than 60%, less than 50%, less than 40%, less than 30%, less than 20% and less than 10% of the weight of the positive electrode, with lower weight percentages typically being advantageous because the balance of the weight of the electrode then can largely be materials that contribute to battery's performance. In $SO_2$ depolarizer battery cells that comprise an electrode that comprises a three-dimensional porous metal structure, the $SO_2$-based electrolyte can penetrate the pores of the three-dimensional porous metal structure and thus partially or completely fill the pores. The conducting element ensures the necessary electrically conductive connection of the $SO_2$-based electrolyte located in the pores and on the surface of the positive electrode and its reduction and oxidation products. Thus, a conducting element comprising a three-dimensional porous metal structure may provide enhanced performance of the $SO_2$ depolarizer battery cell as compared to a $SO_2$ depolarizer battery cell comprising an electrode that does not have the three-dimensional porous metal structure.

Where such a three-dimensional porous metal structure is employed, at least one additional electrode material such as carbon can be incorporated into the pores of the three-dimensional porous metal structure to help facilitate the oxidation-reduction reaction of the $SO_2$-based electrolyte at the positive electrode. This additional electrode material also may be porous, so that the $SO_2$-based electrolyte can penetrate not only into the pores of the three-dimensional porous metal structure, but also into the pores of this additional electrode material, thereby providing an electrode with even greater surface area for the oxidation-reduction reactions that can occur with the $SO_2$-based electrolyte. The amount of such additional electrode material that is provided in the three-dimensional porous metal structure of the electrode is referred to herein as the "loading" of the positive electrode, as is discussed further below. The incorporation of porous additional electrode material into the three-dimensional porous metal structure thus increases the inner surface area of the conducting element and thus the available reaction surface for the reduction-oxidation reaction that takes place at the positive electrode. An electrode having a three-dimensional porous metal conducting element can allow for a significant loading of the positive electrode, which in turn can enhance the capacity of the battery.

Positive Electrodes

Provided below are further details and additional features of positive electrodes that may be used with $SO_2$ depolarizer battery cells of this disclosure. While exemplary materials, dimensions, and other parameters are provided below to guide the person of ordinary skill in formulating the positive electrode(s), the ultimate formulation, material, dimensions, number, positioning, other parameters of the positive electrode(s) will be determined based on the specific battery parameters and desired performance characteristics.

As discussed above, in embodiments the positive electrode of the $SO_2$ depolarizer battery cell has a conducting element that comprises a three-dimensional porous metal structure such as a metal foam, fleece, lattice, matrix or mesh. Such three-dimensional porous metal structures can provide additional surface area as compared to electrodes comprising smooth surfaces having no pores. A metal foam is an example of a three-dimensional porous metal structure that can provide a significant amount of surface area and thus is contemplated as an electrode material that is potentially useful in all embodiments of the $SO_2$ depolarizer battery cells described herein.

As also mentioned above, the electrode may have a considerable thickness ranging from 0.1 mm to 25 mm, and greater than 25 mm. For example, the positive electrode (which contains carbon) can have a thickness selected from the group of 0.1 to 2.0 mm, 0.2 to 0.3 mm, 0.3 to 0.4 mm, 0.4 to 0.5 mm, 0.6 to 0.7 mm, 0.7 to 0.8 mm, 0.8 to 0.9 mm, 0.9 to 1.0 mm, 0.5-1.0 mm, 0.5-2.0 mm, 0.60 to 1.0 mm, 0.65 to 0.85 mm, 1.0 to 1.5 mm, 1.0 to 1.25 mm, 1.25 to 1.5 mm, 1.5 to 2.0 mm, 1.5 to 1.75 mm, 1.75 to 2.0 mm, 2.0 to 2.5 mm, 2.0 to 2.5 mm, 2.5 to 3.0 mm, 2.5 to 2.75 mm, 2.75 to 3.0 mm, 3.0 to 3.5 mm, 3.5 to 4.0 mm, 4.0 to 4.5 mm, 4.5 to 5.0 mm, 5.0 to 10.0 mm, 5.0 to 7.5 mm, 7.5 to 10 mm, 10 to 15 mm, 10 to 12.5 mm, 12.5 to 15 mm, 15 to 17.5 mm, 17.5 to 20 mm, 10 to 15 mm, 12.5 to 17.5 mm, 14 to 16 mm, 15 to 20 mm, 17.5 to 22.5 mm, 20 to 25 mm, greater than 25 mm, about 0.1 to 2.0 mm, about 0.2 to 0.3 mm, about 0.3 to 0.4 mm, about 0.4 to 0.5 mm, about 0.6 to 0.7 mm, about 0.7 to 0.8 mm, about 0.8 to 0.9 mm, about 0.9 to 1.0 mm, about 0.5-1.0 mm, about 0.5-2.0 mm, about 0.60 to 1.0 mm, about 0.65 to 0.85 mm, about 1.0 to 1.5 mm, about 1.0 to 1.25 mm, about 1.25 to 1.5 mm, about 1.5 to 2.0 mm, about 1.5 to 1.75 mm, about 1.75 to 2.0 mm, about 2.0 to 2.5 mm, about 2.0 to 2.5 mm, about 2.5 to 3.0 mm, about 2.5 to 2.75 mm, about 2.75 to 3.0 mm, about 3.0 to 3.5 mm, about 3.5 to 4.0 mm, about 4.0 to 4.5 mm, about 4.5 to 5.0 mm, about 5.0 to 10.0 mm, about 5.0 to 7.5 mm, about 7.5 to 10 mm, about 10 to 15 mm, about 10 to 12.5 mm, about 12.5 to 15 mm, about 15 to 17.5 mm, about 17.5 to 20 mm, about 10 to 15 mm, about 12.5 to 17.5 mm, about 14 to 16 mm, about 15 to 20 mm, about 17.5 to 22.5 mm, about 20 to 25 mm, and greater than 25 mm. Where thicker electrodes are desired, thicknesses of 10 to 20 mm, 12.5 to 17.5 mm, 14 to 16 mm and about 15 mm can provide results that are acceptable. Where $SO_2$ depolarizer battery cells have multiple positive electrodes, the electrodes can be of the same or different thicknesses.

As also mentioned above, at least one additional electrode material can be incorporated into the three-dimensional porous metal structure of the conducting element to catalyze the oxidation-reduction reaction and/or other reactions of the $SO_2$-based electrolyte at the positive electrode. As also discussed above, the additional electrode material can comprise carbon, which itself also may be porous. The carbon can be distributed substantially homogeneously within the three-dimensional porous metal structure or within at least a portion of the three-dimensional porous metal structure. This enables the required electrically conductive connection of carbon via the conducting element. The substantially homogeneous distribution is achieved by substantially evenly incorporating the carbon into the pores of the metal structure or at least within a portion of the pores of the three-dimensional porous metal structure. The amount of carbon incorporated into the porous metal structure is the loading of the positive electrode described above. The substantially homogeneous distribution of the carbon can further improve the performance of the rechargeable battery cell. Whether the carbon is substantially homogenously distributed in all or a portion of the electrode can be determined by cutting the electrode and examining different sections of it, e.g., by SEM.

In this disclosure, unless otherwise stated, the term "substantially" is intended to encompass both wholly and largely but not wholly. For example, "substantially homogenous distribution" is intended to encompass both a wholly homogeneous distribution as well as a distribution that is largely but not wholly homogeneous. Likewise, "substantially evenly incorporating" is intended to encompass both wholly evenly incorporating the carbon as well as largely but not wholly evenly incorporating the carbon into the pores.

As noted above, the carbon used to fabricate the positive electrode also can be porous and therefore provide a large specific surface area. The specific surface area of the carbon that is used to fabricate the positive electrode can be at least 200 $m^2/g$, at least 600 $m^2/g$, at least 1000 $m^2/g$, at least 1400 $m^2/g$, at least 1600 $m^2/g$, and at least 2000 $m^2/g$, for example, 200-500 $m^2/g$, 500-750 $m^2/g$, 750-1000 $m^2/g$, 1000-1500 $m^2/g$, 1000-1250 $m^2/g$, 1250-1500 $m^2/g$, 1500-2000 $m^2/g$, 1500-1750 $m^2/g$, 1750-2000 $m^2/g$, 2000-2500 $m^2/g$, about 200-500 $m^2/g$, about 500-750 $m^2/g$, about 750-1000 $m^2/g$, about 1000-1500 $m^2/g$, about 1000-1250 $m^2/g$, about 1250-1500 $m^2/g$, about 1500-2000 $m^2/g$, about 1500-1750 $m^2/g$, about 1750-2000 $m^2/g$, and about 2000-2500 $m^2/g$, with higher surface areas generally being preferred where higher capacities are desired.

As discussed herein, an increase in the surface area provided by the carbon generally leads to an increase in the capacity of the $SO_2$ depolarizer battery cell and thus improves the performance data of the rechargeable battery cell. Examples of porous carbon material are soots. These soots include combustion soot in the form of lamp, channel and furnace black (so-called 'carbon black'), cracked soot (so-called 'thermal black'). Further examples of the porous carbon material are activated carbon, MesoCarbon Micro-Beads (MCMB), carbon nanotubes (CNT), multi-walled carbon nanotubes (MWCNT) and graphene. Natural graphite, artificial graphite (electrographite), graphite foils, coke (gas coke, metallurgical coke, petroleum coke, retort coke), a carbon fiber material (glassy carbon, foamed carbon), pyrocarbon, pyrographite, aerographite, expanded graphite, fullerenes or amorphous carbon (graphitizable carbon and non-graphitizable carbon) can also be used as porous carbon materials. Other types of porous carbon also may be suitable for use.

Where carbon is used, the loading of carbon in the positive electrode can range from at least 2 $mg/cm^2$ up to 200 $mg/cm^2$ or greater. Generally speaking, up to a point that may be experimentally determined for a specific $SO_2$ depolarizer battery cell, higher loadings will increase the capacity of the $SO_2$ depolarizer battery cells. Beyond that point, however, higher loadings may begin to be detrimental to the capacity and/or other desired performance characteristic(s) of the $SO_2$ depolarizer batter cell. In $SO_2$ depolarizer battery cells, loadings of at least 2 $mg/cm^2$, at least 5 $mg/cm^2$, at least 10 $mg/cm^2$, at least 15 $mg/cm^2$, at least 20 $mg/cm^2$, at least 30 $mg/cm^2$, at least 50 $mg/cm^2$ of carbon, at least 75 $mg/cm^2$ of carbon, or at least 100 $mg/cm^2$ of carbon can be employed. Loadings of the carbon thus can range from 2-10 $mg/cm^2$ of carbon, 10-20 $mg/cm^2$ of carbon, 15-25 $mg/cm^2$ carbon, 20-40 $mg/cm^2$ of carbon, 40-60 $mg/cm^2$ of carbon, 60-80 $mg/cm^2$ of carbon, 50-100 $mg/cm^2$ of carbon, 75-100 $mg/cm^2$ of carbon, 80-100 $mg/cm^2$ of carbon, greater than 100 $mg/cm^2$ of carbon, including 100-150 $mg/cm^2$ of carbon and 150-200 $mg/cm^2$ of carbon, about 2-10 $mg/cm^2$ of carbon, about 10-20 $mg/cm^2$ of carbon, about 15-25 $mg/cm^2$ carbon, about 20-40 $mg/cm^2$ of carbon, about 40-60 $mg/cm^2$ of carbon, about 60-80 $mg/cm^2$ of carbon, about 50-100 $mg/cm^2$ of carbon, about 75-100 $mg/cm^2$ of carbon, about 80-100 $mg/cm^2$ of carbon, greater than about 100 $mg/cm^2$ of carbon, including about 100-150 $mg/cm^2$ of carbon and about 150-200 $mg/cm^2$ of carbon.

As discussed above, materials other than or in addition to carbon may be included in the positive electrode. For example, in embodiments the $SO_2$ depolarizer battery cells can comprise one or more metals or metal-containing compounds such as oxides that can catalyze a reaction leading to one or more discharge products from the $SO_2$-electrolyte during discharge and/or the re-formation of the $SO_2$ during charging. In embodiments, this chemical element can comprise one or more metals selected from the group consisting of vanadium, nickel, copper, magnesium, manganese, titanium, aluminum, lead, palladium, tungsten, chromium, and combinations thereof. For example, the electrode can comprise vanadium oxide. The additional chemical element(s) (or compound(s) containing the chemical element(s)) can be present in the positive electrode in a concentration of from 0.01 to 20 weight percent (weight %) or more based on the total weight of the carbon of the electrode, e.g., from 5 to 15 weight % based on the total weight of the carbon of the electrode. Within these ranges, the additional catalytic chemical element(s) and/or compound(s) containing the chemical element(s), e.g., vanadium oxide, can be present in an amount of from 0.01 to 1 weight %, 1 to 5 weight %, from 2.5 to 7.5 weight %, from 5 to 10 weight %, from 7.5 to 12.5 weight %, from 10 to 15 weight %, from 12.5 to 17.5 weight %, from 15 to 20 weight %, greater than 20 weight %, about 0.01-1 weight %, about 1-5 weight %, about 2.5-7.5 weight %, about 5-10 weight %, about 7.5-12.5 weight %, about 10-15 weight %, about 12.5-17.5 weight %, about 15-20 weight %, and greater than about 20 weight %.

Generally speaking, electrodes having high porosity will provide higher capacity $SO_2$ depolarizer battery cells. The porosity represents the ratio of the cavity volume to the total volume of the positive electrode, whereby the cavity volume is formed by the pores. The porosity leads to an enlargement of the inner surface area of the positive electrode. Generally speaking, it is advantageous if the individual pores of the positive electrode can be completely filled with the $SO_2$-based electrolyte during operation of the rechargeable battery cell. For absorption of the solid reaction products formed from the $SO_2$-based electrolyte during discharge, high porosity and thus large inner surface area are generally advantageous. Porosity will be determined by a number of factors, including the porosity of the porous base electrode material, e.g., the metal mesh, the loading of material (e.g., binder and carbon) into the electrode (which fills pores in the porous base material), and also any calendaring (discussed below) that is performed to compress the electrode in order to reduce the overall volume of the electrode. Decreasing the dimensions of the electrode by calendaring (i.e., compressing the electrode) will decrease the volume of the electrode and thus correspondingly decrease the porosity. Calendaring can enable a smaller battery size and/or the use of more electrodes, and also can increase the mechanical stability.

Generally speaking, therefore, the porosity of the porous starting electrode material, e.g., metal foam can be very high, e.g., greater than 90%, but the final porosity of the electrode will be lower. Depending on such factors, the porosity thus can range from well less than 50% to greater than 97%, e.g., from 10-20%, 10-30, 10-40%, 20-30%, 20-40%, 20-50%, 30-40%, 30-50%, 30-60%, 40-50%, 40-60%, 40-70%, 50-60%, 50-70%, 50-80%, 60-70%, 60-80%, 60-90%, 70-80%, 70-90%, 80-90%, greater than 90%, about 10-20%, about 10-30, about 10-40%, about 20-30%, about 20-40%, about 20-50, about 30-40%, about 30-50%, about 30-60%, about 40-50%, about 40-60%, about 40-70%, about 50-60%, about 50-70%, about 50-80%, about 60-70%, about 60-80%, about 60-90%, about 70-80%, about 70-90%, about 80-90%, and greater than about 90%, with higher porosity of the starting electrode material (e.g., metal foam) generally enabling the construction of electrodes having greater loadings and thus higher energy capacity. Additionally, the porosity reduces the density of the electrodes and thus their weight, which can have a positive effect on the total weight of the rechargeable battery cell.

The porosity of the final positive electrode can be measured using commercially available mercury porosimetry devices. The porosity of the starting electrode material, e.g., metal foam, is usually available from the supplier.

In order to improve its mechanical strength and, e.g., bind the carbon to the conducting element, the positive electrode typically contains at least one binder. Such binders may be used with any or all of the $SO_2$ depolarizer battery cells disclosed herein. The binder may be a fluorinated binder, in particular a polyvinylidene fluoride (PVDF) and/or a terpolymer of tetrafluoroethylene, hexafluoropropylene and vinylidene fluoride (THV). Furthermore, the binder may comprise a polymer that comprises monomeric structural units of a conjugated carboxylic acid or of the alkali salt, earth alkali salt or ammonium salt of this conjugated carboxylic acid, or a combination thereof. The binder may also comprise a polymer based on monomeric styrene structural units or butadiene structural units. The binder also may belong to the group of carboxyalkyl celluloses and their salts. At least one (or a combination) of the binders mentioned above may be present in the positive electrode. The amount of binder employed will be determined for each battery. Typically, the weight of the binder(s) in the electrode will be in an amount that is not more than 30% by weight relative to the total weight of the electrode, e.g., not more than 25%, not more than 20%, not more than 15%, not more than 10%, not more than 7%, not more than 5% by weight, or not more than 2% by weight relative to the total weight of the electrode, e.g., 0.5 to 2.0%, 1-5%, 2.5-5%, 2-8%, 4-8%, 5-10%, 5-7.5%, 7.5%, 7.5-10%, 10-20%, 10-12.5%, 12.5-15%, 10-15%, 15-20%, 20-25%, 25-30%, about 0.5 to 2.0%, about 1-5%, about 2.5-5%, about 2-8%, about 4-8%, about 5-10%, about 5-7.5%, about 7.5-10%, about 10-20%, about 10-12.5%, about 12.5-15%, about 10-15%, about 15-20%, about 10-20%, about 20-25%, about 25-30%, with lower percents by weight generally being preferred. The addition of a binding agent improves the long-term stability and service life of the rechargeable battery cell, and also can serve to adhere carbon to the metal electrode.

The positive electrode optionally also can contain a metal halide in addition to carbon, e.g., a metal chloride, a metal fluoride and a metal bromide. As metal chloride, the positive electrode may contain copper chloride ($CuCl_2$), for example. These metal halides are electrochemically active materials that can be reduced during discharge and oxidized during charging of the rechargeable battery cell. The content of the metal halide in the positive electrode can be at least 2%, at least 5%, at least 10 wt %, at least 20 wt %, at least 30 wt %, at least 40 wt %, at least 50 wt %, at least 60 wt %, at least 70 wt %, and at least 80 wt % relative to the total weight of the electrode, e.g., 2-5%, 5-10%, 10-20%, 20-30%, 30-40%, 40-50%, 50-60%, 60-70%, 70-80%, and 80-90% relative to the total weight of the electrode, with higher amounts typically providing greater charge capacity. The capacity properties of the positive electrode thus can be improved by adding a metal halide, in particular metal chloride.

The cathode of an $SO_2$ depolarizer battery cell can be prepared as follows. A paste can be produced comprising carbon, which is advantageously porous, and a binder such as a fluorinated binder. The fluorinated binder may first be dissolved in a solvent. Carbon and additional ingredients (e.g., catalytic agent(s)) and/or solvents can then be added, with stirring, to the binder-solvent solution. The resulting composition is then introduced to the cathode scaffold, e.g., a porous metallic foam conducting element, such that the carbon is substantially homogenously distributed throughout the cathode or portions thereof. The cathodic material is then dried or annealed at elevated temperature. If desired, the cathode material then can be compressed to form a denser foam material. The Examples below provides descriptions of processes for making a positive electrode for use in an $SO_2$ depolarizer battery cell of this disclosure.

Negative Electrodes

Provided below are features and details of negative electrodes that may be used with $SO_2$ depolarizer battery cells of this disclosure. While exemplary materials, dimensions, and other parameters are provided below to guide the person of ordinary skill in formulating the negative electrode(s), the ultimate formulation, material, dimensions, number, positioning and other parameters of the negative electrode(s) will be determined based on the specific battery parameters and desired performance characteristics.

The negative electrode comprises an active metal in the $SO_2$ depolarizer battery cell. The active metal of the rechargeable battery cell is the metal whose ions within the electrolyte migrate to the negative or positive electrode when the cell is charged or discharged, where they participate in electrochemical processes that lead directly or indirectly to the release of electrons into the external circuit or to the absorption of electrons from the external circuit. This active metal is an alkali metal, an alkaline earth metal, a metal of group 12 of the periodic table of elements or aluminum. It is stored in the negative electrode when the rechargeable battery cell is charged.

Practically speaking, substantially all negative electrodes will employ an active metal that is selected from the group consisting of lithium, sodium, calcium, zinc or aluminum. Among these, alkali metals, and especially lithium, are the most commonly employed active materials in the negative electrode. The inorganic material may also comprise at least one oxide, at least one sulfide, at least one phosphide, at least one nitride, and/or at least one fluoride. The content of the active metal in the negative electrode can amount to 20 to 100% by weight.

When lithium is used as the active metal, it is commonly provided as metallic lithium, a lithium-containing alloy, a lithium-containing intermetallic compound, a lithium-containing carbon material, a lithium-containing inorganic material or the like.

For example, if the conductive salt in the $SO_2$-based electrolyte is an alkali metal salt in the form of a lithium salt, such as lithium tetrachloroaluminate ($LiAlCl_4$), then the negative electrode may consist of metallic lithium, a lithium-containing carbon material, a lithium-containing alloy, an oxide or a sulfide of the following elements: tin, silicon, aluminum, phosphorus, zinc, gallium, germanium, silver, indium, antimony or bismuth.

If sodium is used as the active metal, metallic sodium, a sodium-containing alloy, a sodium-containing intermetallic compound, a sodium-containing carbon material, a sodium-containing inorganic material or the like may be used as the negative electrode material.

The amount of active material comprising the negative electrode, i.e., the loading of the electrode relative to its surface area, is selected from the group consisting of at least 10 mg/cm$^2$, at least 20 mg/cm$^2$, at least 40 mg/cm$^2$, at least 60 mg/cm$^2$, at least 80 mg/cm$^2$ and at least 100 mg/cm$^2$, e.g., 10-20 mg/cm$^2$, 20-30 mg/cm$^2$, 30-40 mg/cm$^2$, 40-60 mg/cm$^2$, 60-80 mg/cm$^2$, 80-100 mg/cm$^2$, about 10-20 mg/cm$^2$, about 20-30 mg/cm$^2$, about 30-40 mg/cm$^2$, about 40-60 mg/cm$^2$, about 60-80 mg/cm$^2$, and about 80-100 mg/cm$^2$. Generally speaking, higher amounts of active material in the negative electrode will have a positive effect on the charging and discharging process of the rechargeable battery cell.

The negative electrode can have a thickness within the range of from 0.05 mm to 20 mm, although the thickness typically will not exceed 15 mm. Within this range are thicknesses of at least 0.05 mm, at least 0.10 mm, at least 0.50 mm, at least 1.00 mm, at least 1.50 mm, at least 2.00 mm, and at least 2.50 mm. For example, the thickness can be selected from the group consisting of 0.05-0.1 mm, 0.1-0.5 mm, 0.5-1.0 mm, 0.5-2.0 mm, 1.0-1.5 mm, 1.5-2.0 mm, 2.0-2.5 mm, 2.5-3.0 mm, 3.0-3.5 mm, 3.5-4.0 mm, 4.0-4.5 mm, 4.5-5.0 mm, 5.0-7.5 mm, 7.5-10 mm, 10-15 mm, 10-12.5 mm, 12.5-15 mm, 15-17.5 mm, 17.5-20 mm, 10-15 mm, about 0.05-0.1 mm, about 0.1-0.5 mm, about 0.5-1.0 mm, about 0.5-2.0 mm, about 1.0-1.5 mm, about 1.5-2.0 mm, about 2.0-2.5 mm, about 2.5-3.0 mm, about 3.0-3.5 mm, about 3.5-4.0 mm, about 4.0-4.5 mm, about 4.5-5.0 mm, about 5.0-7.5 mm, about 7.5-10 mm, about 10-15 mm, about 10-12.5 mm, about 12.5-15 mm, about 15-17.5 mm, about 17.5-20 mm, and about 10-15 mm. $SO_2$ depolarizer battery cells can have multiple negative electrodes of the same or different thicknesses.

The negative electrode comprises a conducting element. This negative electrode conducting element may have a planar structure or a three-dimensional porous metal structure such as a metal foam, fleece, lattice, matrix or mesh. The negative electrode conducting element is also used to ensure the necessary electronically conductive connection of the active material of the negative electrode and thus contributes to the performance of the $SO_2$ depolarizer battery cell.

The negative electrode also can comprise at least one binder, which may contribute to its mechanical strength. This binder may be a fluorinated binder, in particular a polyvinylidene fluoride (PVDF) and/or a terpolymer of tetrafluoroethylene, hexafluoropropylene and vinylidene fluoride (THV). Furthermore, the binder may comprise a polymer, which is made of monomeric structural units of a conjugated carboxylic acid or of the alkali salt, earth alkali salt or ammonium salt of this conjugated carboxylic acid or a combination thereof. The binder may also comprise a polymer based on monomeric styrene structural units or butadiene structural units. The binder may also belong to the group of carboxyalkyl celluloses and their salts. Binders such as those mentioned above may be present in the negative electrode in an amount of no more than 20% by weight, no more than 15% by weight, no more than 10% by weight, no more than 7%, by weight, no more than 5% by weight, and no more than 2% by weight relative to the total weight of the electrode, with lower percents by weight being generally preferred. The addition of a binding agent can improve the long-term stability and service life of the rechargeable battery cell.

Electrolyte Based on $SO_2$

As discussed above, the $SO_2$ depolarizer battery cells comprise an $SO_2$-based electrolyte containing an $SO_2$ concentration that is sufficient to permit the mobility of the ions in the conductive salt, which salt is contained in the electrolyte and causes the charge transport. The $SO_2$-based electrolyte also acts as the active electrode depolarizer.

The amount of $SO_2$ in the $SO_2$ depolarizer battery cells typically is at least 0.5 mol $SO_2$ per mol conductive salt and typically not more than 20 mol $SO_2$ per mol conductive salt. $SO_2$-based electrolytes within such ratios between the $SO_2$ and the conductive salt typically can dissolve a larger amount of conductive salt than electrolytes based on an organic solvent mixture. Within this range are amounts of 0.5-8.0 mol $SO_2$ per mol conductive salt, 1.0-6.0 mol $SO_2$ per mol conductive salt, 1.0-5.0 mol $SO_2$ per mol conductive salt, 1.5-5.0 mol $SO_2$ per mol conductive salt, 2.0-5.0 mol $SO_2$ per mol conductive salt, 2.0-4.0 mol $SO_2$ per mol conductive salt, 2.5-5.0 mol $SO_2$ per mol conductive salt, 3.0-5.0 mol $SO_2$ per mol conductive salt, 3.0-6.0 mol $SO_2$ per mol conductive salt, 2.0-3.0 mol $SO_2$ per mol conductive salt, 1.5-2.5 mol $SO_2$ per mol conductive salt, 1.75-2.25 mol $SO_2$ per mol conductive salt, about 2.0-5.0 mol $SO_2$ per mol conductive salt, about 2.0-4.0 mol $SO_2$ per mol conductive salt, about 2.5-5.0 mol $SO_2$ per mol conductive salt, about 3.0-5.0 mol $SO_2$ per mol conductive salt, about 3.0-6.0 mol $SO_2$ per mol conductive salt, about 2.0-3.0 mol $SO_2$ per mol conductive salt, about 1.5-2.5 mol $SO_2$ per mol conductive salt, about 1.75-2.25 mol $SO_2$ per mol conductive salt, and about 2.0 mol $SO_2$ per mol conductive salt. As shown in Experiment 7 and Table 3 below, when $LiAlCl_4$ is used as the electrolyte, between 1.5-2.5 mol $SO_2$ per mol conductive salt and, and 2.0 mol $SO_2$ per mol conductive salt can be used.

The concentration of $SO_2$ in the electrolyte affects its vapor pressure. $SO_2$ depolarizer battery cells comprising lower concentrations of $SO_2$ per mol conductive salt in the $SO_2$ depolarizer battery cells disclosed herein may not need to be under pressure and therefore may not require pressurized housings. This can provide an advantage cell in terms of the manufacturing processes that are required as compared to rechargeable lithium batteries that require pressurized housings.

The concentration of $SO_2$ in the electrolyte also affects its conductivity. Depending on the concentration of $SO_2$, different conductivity values are achieved. Thus, by changing the $SO_2$ concentration, one can adapt the conductivity of the electrolyte to the intended use of the $SO_2$ depolarizer battery cell. The $SO_2$-based electrolyte typically contains between 20 and 75 wt % $SO_2$ based on the total amount of electrolyte contained in the rechargeable battery cell. Within this range are 25-70 wt % $SO_2$, 30-65 wt %, 35-70 wt %, 40-65 wt %, 40-55 wt %, 45-65 wt %, 50-65 wt %, 45-55 wt %, 50-60 wt %, 55-65 wt %, 60-70 wt %, 65-50 wt %, about 25-70 wt % $SO_2$, about 30-65 wt %, about 35-70 wt %, about 40-65 wt %, about 40-55 wt %, about 45-65 wt %, about 50-65 wt %, about 45-55 wt %, about 50-60 wt %, about 55-65 wt %, about 60-70 wt %, 65-50 wt %, about 25 wt %, about 30 wt %, about 40 wt %, about 50 wt %, about 55 wt %, and about 65 wt % based on the total amount of electrolyte contained in the rechargeable battery cell.

Typically, the $SO_2$-based electrolyte comprises one or more conductive salts selected from the group consisting of an aluminate, halide, oxalate, borate, phosphate, arsenate and gallate of an alkali metal or alkaline earth metal. The conductive salt is typically a lithium tetrahaloaluminate, and most typically $LiAlCl_4$. The conductive salt in the $SO_2$-based electrolyte may comprise at least 20 wt %, at least 30 wt % of the weight of the electrolyte, at least 35 wt %, at least 40 wt %, at least 45 wt %, or at least 50 wt % of the weight of the electrolyte. Within these amounts are ranges of 20-30 wt %, 30-40 wt %, 30-50 wt %, 30-60 wt %, 35-70 wt %, 40-50 wt %, 50-60 wt %, about 20-30 wt %, about 30-40 wt %, about 30-50 wt %, about 30-60 wt %, about 35-70 wt %, about 40-50 wt %, and about 50-60 wt % of the weight of the electrolyte.

In addition to the conductive salt, the $SO_2$-based electrolyte also typically may comprise as an additive an alkali metal or alkaline earth metal halide or halide of the groups 11, 12 or 13 of the periodic table of elements. It is desirable that in addition to this halide, further salts are present at a concentration of up to about 20 percent by weight of the total weight of the electrolyte, e.g., at least 2% by weight, at least 4% by weight, at least 6%, at least 8%, at least 10% by weight and at least 12% by weight, such values including, e.g., 1-20% by weight, 1-5% by weight, 5-10% by weight, 10-15% by weight, 15-20% by weight, about 1-20% by weight, about 1-5% by weight, about 5-10% by weight, about 10-15% by weight and about 15-20% by weight based on the total weight of electrolyte contained in the rechargeable battery cell. For example, the electrolyte may contain $LiAlCl_4$ as a conductive salt and additionally free aluminum chloride ($AlCl_3$) as an additive. Adding the additive such as $AlCl_3$ increases the capacity that can be retrieved from the rechargeable battery cell. Such an additive can, for example, interact or react with the $SO_2$-based electrolyte, dissociate in the $SO_2$-based electrolyte, be involved in the electrode processes, or can be present in the $SO_2$-based electrolyte substantially chemically unchanged.

The amount of $SO_2$ and conductive salt in the electrolyte typically may comprise 50-99% by weight of the electrolyte, e.g., at least 50 wt %, at least 60 wt %, at least 70 wt %, at least 80 wt %, at least 85 wt %, at least 90 wt %, at least 95 wt % or at least 99 wt % of the weight of the electrolyte.

Where desired, the $SO_2$-based electrolyte can have only a limited amount or even no amount of additives comprising organic substances and/or material(s) other than organic substances. Typically, the proportion of organic substances or other material(s), e.g., combustible and/or explosive materials, in the $SO_2$-based electrolyte, for example, in the form of one or more solvents or additives, will range from 0 to not more than 50 wt % based on the weight of the electrolyte, e.g., not more than 40% by weight, not more than 30% by weight, not more than 20% by weight, not more than 15% by weight, not more than 10% by weight, not more than 5% by weight, not more than 1% by weight of the electrolyte, and substantially 0% by weight of the electrolyte. That is, the $SO_2$-based electrolyte may be substantially free of organic solvents and/or other combustible and/or explosive material(s). By keeping the content of organic solvents and other organic substances or other combustible or explosive materials in the $SO_2$-based electrolyte low or even zero, the electrolyte is either barely combustible or substantially not combustible, which in turn increases the operational safety of such $SO_2$ depolarizer battery cells. As used herein the word combustible means that the material is able to catch fire and burn easily. $SO_2$ depolarizer battery cells that are low in amounts of, or are substantially free of, combustible components thus can provide a safety advantage as compared to rechargeable batteries that comprise combustible components.

Advantageously, the $SO_2$-based electrolyte is also substantially free of impurities, including water, organic substances and/or other materials. Such impurities may be caused, for example, by a carbonaceous coating of the active material of the positive electrode or by other carbonaceous materials such as the negative electrode. In embodiments, the amount of water and organic impurities and/or other impurities are each present in an amount that is less than 1000 ppm, less than 500 ppm, less than 400 ppm, less than 300 ppm, less than 200 ppm, less than 100 ppm, less than 50 ppm, less than 25 ppm, less than 10 ppm, less than 5 ppm, less than 1 ppm and 0 ppm. Advantageously, the amount of water and organic impurities are each limited to less than about 50 ppm or less. Preferably the electrolyte is substantially free of water. Preferably the electrolyte also is substantially free of organic impurities.

Separator

The rechargeable battery cell typically will have a separator for electrical separation of the positive and negative electrodes. This separator may consist of a non-woven material, a membrane, woven or knitted fabric, organic material, inorganic material or a combination thereof. Organic separators may consist of unsubstituted polyolefins (e.g., polypropylene or polyethylene), partially to completely halogen-substituted polyolefins (e.g., partially to completely fluorine-substituted; e.g., PVDF, ETFE, PTFE), polyesters, polyamides or polysulfones. Separators, which combine organic and inorganic materials, include, for example, glass fiber textile materials whose glass fibers are coated with a suitable polymer. The coating preferably contains a fluorine-containing polymer such as polytetrafluoroethylene (PTFE), ethylene-tetrafluoroethylene (ETFE), perfluoroethylene propylene (FEP), THV (terpolymer of tetrafluoroethylene, hexafluoropropylene and vinylidene fluoride) or a perfluoroalkoxy polymer (PFA). It may also contain an aminosilane, a polypropylene (PP) or polyethylene (PE). The separator further may be treated with a surfactant to improve wettability or other properties.

By combining the positive electrode described above and the $SO_2$-based electrolyte, it is possible to produce $SO_2$ depolarizer battery cells that provide one or more of the following properties and/or advantages:

the theoretically calculated energy density of the $SO_2$ depolarizer battery cell with housing is approximately 1200 Wh/kg relative to the total weight of the battery cell. At least 80% of the energy density can actually be used.

depending on the loading of the positive electrode with carbon, specific discharge capacities of up to approx. 8000 mAh/g carbon can be achieved. Such a discharge capacity is significantly higher than a rechargeable battery cell with a positive electrode containing lithium iron phosphate as active material.

the positive electrodes can be very thick, and thus fewer electrodes may be required within a cell. The current discharge and the structure of the cell thus can be simplified.

the self-discharge is extremely low, e.g., the loss of capacity of a fully charged cell will be lost during one month of storage at room temperature, i.e., 23° C., is less than 5%, less than 4%, less than 3%, less than 2% or less than 1%. The $SO_2$ depolarizer battery cell can therefore be stored for extended periods when charged and used immediately without recharging.

the energy content of the rechargeable battery cell can be high. This allows more energy to be provided with fewer cells, which can also lead to lower production costs.

if the positive electrode is made of carbon, then production costs can be reduced as compared to electrodes made of more expensive materials, e.g., alkali metal oxides or phosphates.

the $SO_2$ depolarizer battery cell can have a lower total weight due to the porosity of the positive electrode, as compared to rechargeable cells that do not have a porous positive electrode.

Rechargeable batteries as disclosed herein thus may be suitable for a wide range of potential uses and applications, including but not limited to:

automotive and recreational vehicle power supply, e.g., for electric and hybrid automobiles, or for providing power to such vehicles, e.g., as a battery for starter motors or for running equipment;

large transportation vehicles such as trucks, locomotives and ships;

smaller transportation devices such as golf carts, motorcycles, bicycles, scooters, ATVs, Segways and similar self-propelled devices;

battery-powered toys and games;

emergency power backup or uninterruptible power supply (UPS), electrical grid storage (e.g., for storing electric energy at times of low demand for use during peak periods, distributed electricity generation an standalone power systems;

solar and wind power energy storage;

marine devices such as boats and boat motors or for running equipment on boats;

personal and small electronic devices such as laptops, tablets, phones;

gaming devices and accessories such as remote controls and 3D headsets;

surveillance or alarm system power supply personal mobility equipment such as electric wheelchairs and stair lifts, industrial machinery such as forklifts, robots and robotic devices such as vacuums, lawn and garden equipment such as mowers, trimers and chain saws, construction equipment such as power tools;

farm equipment such as tractors;

aircraft, including airplanes, helicopters and drones;

household appliances;

portable powerpacks for providing electrical power supply (including for recharging other rechargeable batteries); and most applications where an internal combustion engine is currently used.

Multiple battery types may be produced, including batteries typically used in household devices, e.g., sizes AAA, AA, C, D, 9V, 18650, 21700 and 26650.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
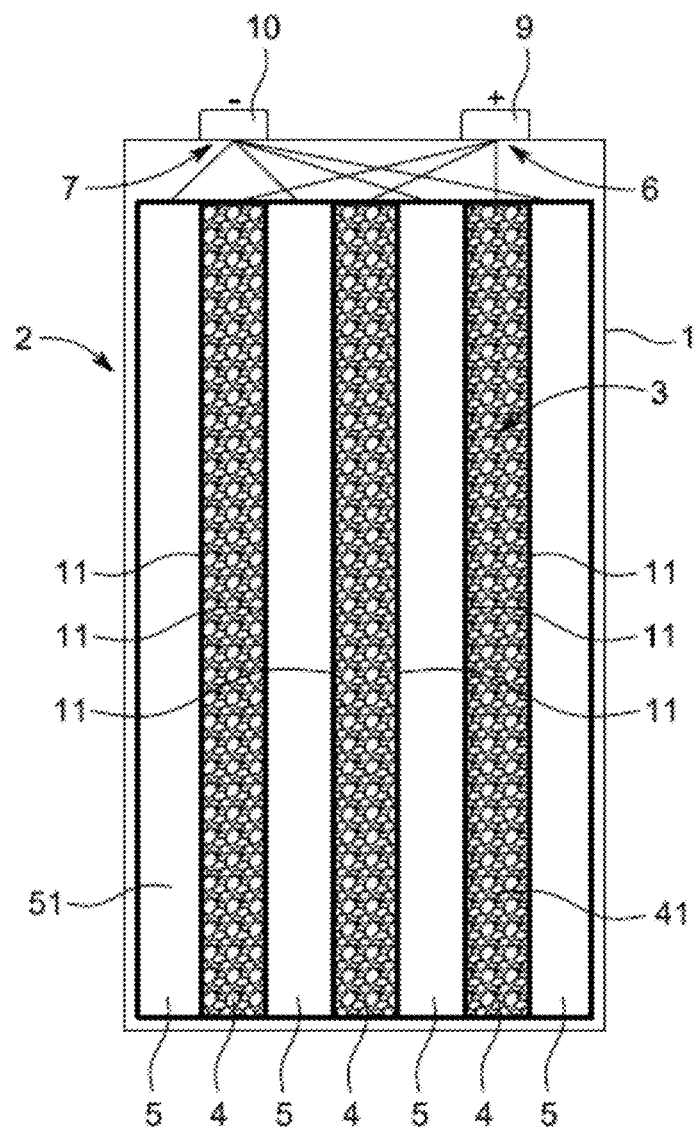
FIG. 1 shows an example of an $SO_2$ depolarizer battery cell as disclosed herein in a cross-sectional representation.

FIG. 1 provides a cross-sectional view of an exemplary embodiment of an $SO_2$ depolarizer battery cell in accordance with this disclosure. This $SO_2$ depolarizer battery cell is illustrated as a prismatic cell and has, among other things, a housing 1. This housing 1 encloses an electrode array 3, comprising three positive electrodes 4 and four negative electrodes 5. The positive electrodes 4 and the negative electrodes 5 are alternately stacked in the electrode array 3. In this exemplary embodiment, the positive electrodes of the rechargeable battery cell are illustrated as a foam that contains porous carbon, e.g., in the form of activated carbon. The negative electrodes 5 are made of a metal, e.g., metallic lithium.

Housing 1 can also accommodate more positive electrodes 4 and/or negative electrodes 5. In general, it is preferred that the number of negative electrodes 5 is one greater than the number of positive electrodes 4. As a result, the front surfaces of the electrode stack consist of the electrode surfaces of the negative electrodes 5. The electrodes 4, 5 are connected via electrode connections 6, 7 with corresponding battery cell contacts 9, 10. The rechargeable battery cell is filled with an $SO_2$-based electrolyte (not shown) that advantageously can penetrate at least almost completely into all pores or cavities of the positive electrodes 4, 5. In an $SO_2$ depolarizer battery cell as illustrated in this figure, the electrolyte can comprise, e.g., 1 mole of $LiAlCl_4$ in 1.5 moles of $SO_2$.

In FIG. 1, electrodes 4 and 5 have a flat design, i.e., layers of low thickness in relation to their area. Electrodes 4 and 5 can have almost the same thickness as shown in FIG. 1, but they can also have different thicknesses. For example, the negative electrode 5 may be thinner than the positive electrode 4. Each of the positive electrodes may be of the same or different thickness. Likewise, each of the negative electrodes may be of the same or different thickness.

The electrodes 4, 5 are separated from each other by separators 11. In this example, these separators 11 are made of a glass fiber textile material. Housing 1 of the depicted rechargeable battery cell is essentially cuboid in shape, i.e., having six substantially rectangular faces at right angles to each other, the electrodes 4, 5 and the walls of housing 1 shown in sectional diagram extending perpendicularly to the drawing layer and being essentially straight and flat.

Alternatively, however, the $SO_2$ depolarizer battery cell can also be designed as a spiral-wound cell. When using a spiral-wound cell design, the electrodes consist of thin layers which are wound up together with a separator material. The separator material separates the positive and negative electrode spatially and electrically, but it is also permeable to the ions of the active metal. In this way, large electrochemically effective surfaces are created, which enable a correspondingly high current efficiency.

The rechargeable battery cell can also be designed as a bobbin cell. In this case, a thick porous positive electrode is located inside a battery housing and occupies most of the volume. Depending on whether the housing is round or rectangular, one or more negative electrodes are used. These are placed between the housing wall and the thick positive electrode. The electrodes are electrically separated from each other by a separator. The electrolyte is distributed in the cavities and pores inside the housing.

Electrodes 4, 5 have conducting elements 41, 51, which allow for the necessary electronically conductive connection of the active material of each electrode 4, 5. The conducting elements 41, 51 are in contact with the active materials involved in the electrode reaction of the respective electrode 4, 5. As mentioned above, porous metal foam is used for the conducting element 41 of the positive electrode 4. This metal foam extends substantially over the entire thickness of the electrode 4. The carbon material is incorporated into the pores of this metal foam.

During the production of the positive electrodes 4, the carbon material can be incorporated into the porous structure of the conducting element 41 in such a way that it fills its pores substantially uniformly over the entire thickness of the metal structure. The electrode material produced in this way is then compacted under high pressure, e.g., by calendaring.

Figure 2:
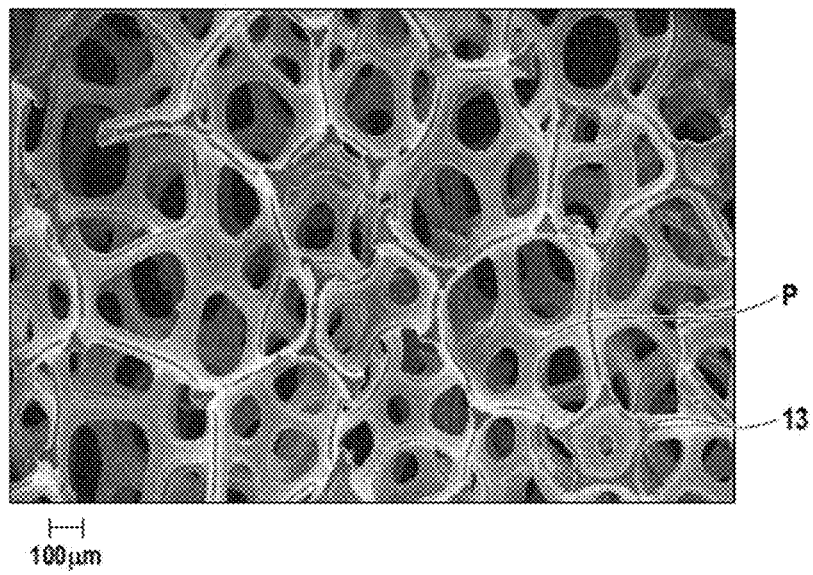
FIG. 2 shows an electron microscope image of the three-dimensional porous structure of a metal foam of a conducting element an $SO_2$ depolarizer battery cell as disclosed herein.

FIG. 2 shows an electron microscope image of the three-dimensional porous structure of a metal foam 13 that can be used as the conducting element in forming a positive electrode as shown in FIG. 1. In this figure, the metal foam, which is the conducting element of the positive electrode, is unfilled. The scale shows that the pores P have an average diameter of more than 100 μm, i.e., they are relatively large.

As discussed herein, such a porous metal foam can extend to over 90% of the total thickness 'd' of the conducting element, such as that illustrated in FIG. 1. Carbon may be distributed throughout the porous metal foam 13. Advantageously, the carbon is substantially homogeneously distributed thereby minimizing any variations in the cell function due to variations in the distribution of the carbon. To improve its mechanical strength, the positive electrode 4 also may contain a binder such as THV.

Example 1: Production of a Positive Electrode

A positive electrode was produced as described below:

First, a paste was produced using 80 wt % of a carbon having a high surface area, and 20 wt % of a fluorinated binder.

For this purpose, the fluorinated binder was first dissolved in a solvent. Afterward, carbon was added alternately with other solvents while stirring. The paste was then substantially homogeneously introduced into a three-dimensional porous metal structure of a metallic foam conducting element, which has an initial porosity of more than 90%. It is then dried or annealed at 50° C. for one hour, thereby producing the electrode material. After cooling, this electrode material, i.e., the carbon homogeneously introduced into the metal foam, was compressed to a thickness of 0.5 mm by means of a calendar, starting from an initial thickness of 1.6 mm. From this pressed and tempered electrode material, pieces with a surface of 1 $cm^2$ were punched out to obtain the positive electrode. The positive electrode had a carbon loading of approx. 3 $mg/cm^2$.

In the experiments described below, the positive electrode was used as the electrode to be examined, i.e., as the so-called working electrode. It was examined in a half-cell with a three-electrode array. Its reference and counter electrodes were each made of metallic lithium. The $SO_2$-based electrolyte used in the half-cell had the composition of $LiAlCl_4*1.5\ SO_2$.

Eight experiments were performed using half-cells prepared using the method described in Example 1 or variations thereof.

Experiment 1

Figure 3:
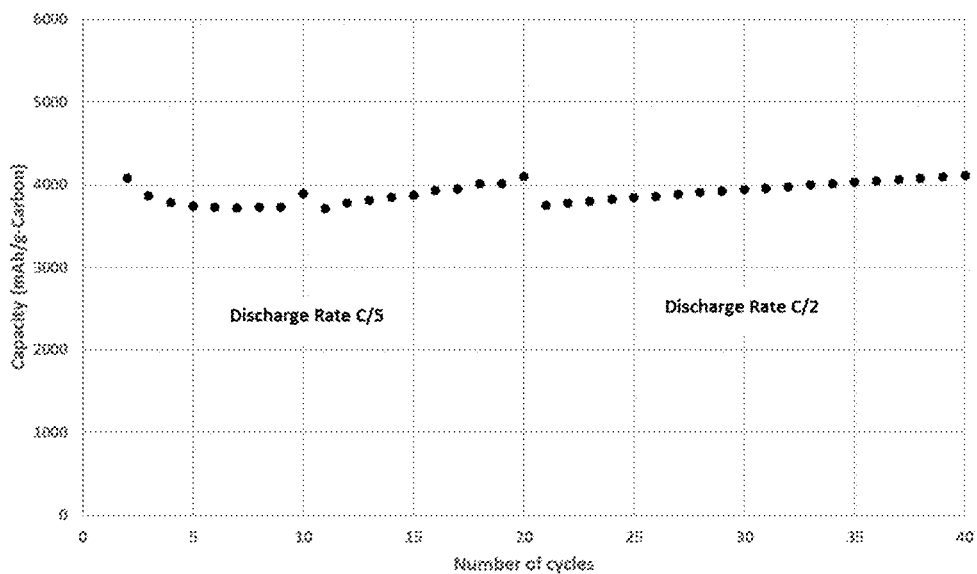
FIG. 3 shows the discharge capacity as a function of the number of charge and discharge cycles of a positive electrode in a first half-cell experiment according to Experiment 1.

In a first experiment, the capacity of a half-cell was determined in relation to the number of charging and discharging cycles using positive electrodes produced according to the method described in Example 1. This half-cell was based on the three-electrode array described above for FIG. 1, which was immersed in the $SO_2$-based electrolyte of the above composition. FIG. 3 shows the capacity of the half-cell as a function of the number of cycles. The number of cycles represents the number of repeated charging and discharging operations. The half-cell was first formed using a charge/discharge rate of C/10. These formation cycles are not shown. The term 'formation cycles' refers to the initial cycles of the half-cell prior to the start of the actual measurement. After these formation cycles, the half-cell was first discharged at a C/5 discharge rate for 20 cycles, followed by another 20 cycles at a C/2 discharge rate. By definition, the nominal capacity of a cell is discharged in one hour at a discharge rate of 1C, from which the discharge current can be determined accordingly. The capacities shown in FIG. 3 were adjusted to the amount of carbon (in grams) contained in the respective positive electrode.

FIG. 3 shows that the half-cell has a discharge capacity of approximately 4000 mAh/g carbon over 40 cycles. Increasing the discharge rate from C/5 to C/2 does not affect the capacity output. This shows the high capacities that are provided by the $SO_2$ depolarizer battery cells of the disclosure.

Experiment 2

Figure 4:
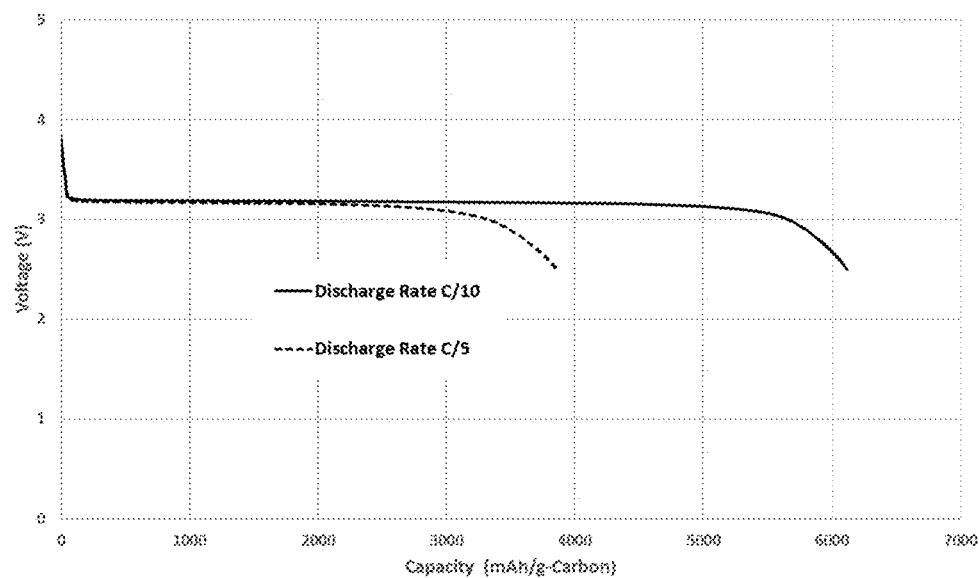
FIG. 4 shows two discharge curves of positive electrodes in a second half-cell experiment according to Experiment 2.

In a second half-cell experiment, a positive electrode produced on the basis of Example 1 was discharged at a discharge rate of C/5 and a discharge rate of C/10, starting at a voltage of 3.85 volts up to a final discharge voltage of 2.5 volts. FIG. 4 shows the voltage in volts (V) as a function of the capacity and thus the discharge curves of the half-cell. At a discharge rate of C/5, a capacity of approx. 4000 mAh/g of carbon is achieved. This corresponds to the values from Experiment 1 described above. However, at the lower discharge rate of C/10, capacity values of approx. 6500 mAh/g of carbon are achieved. This experiment demonstrates the substantial power capability of $SO_2$ depolarizer battery cells as disclosed herein.

Experiment 3

In a third half-cell experiment, the impact of a catalyst on the capacity yield was examined. For this purpose, a catalyst was incorporated into the positive electrode. Vanadium oxide ($V_2O_5$) was used as catalyst. The positive electrode using $V_2O_5$ as catalyst was produced the same way as in Example 1, with the difference that the following composition was used as electrode material:

| 75 wt % | carbon in the form of high surface carbon |
| 20 wt % | fluorinated binder |
| 5 wt % | $V_2O_5$ |

Figure 5:
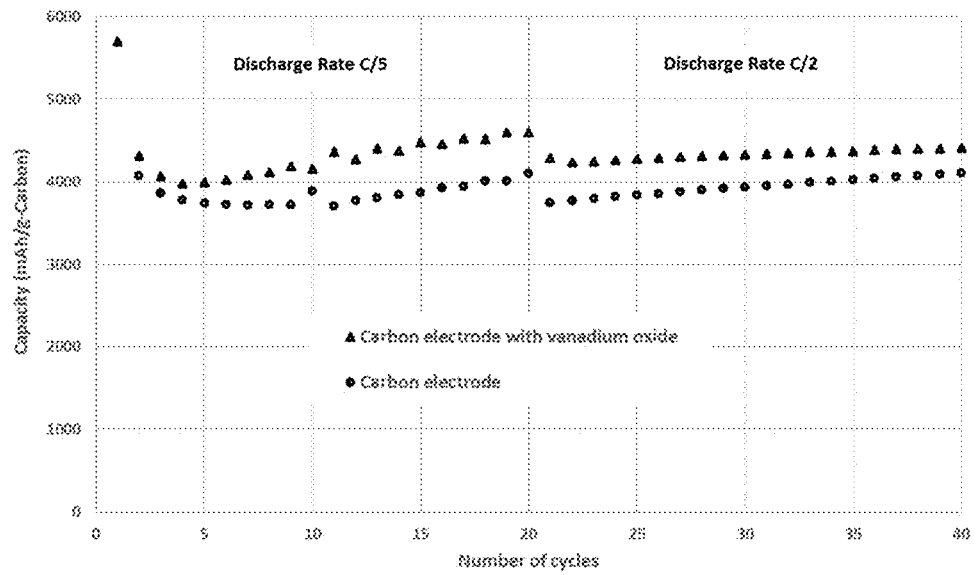
FIG. 5 shows the discharge capacity as a function of the number of charge and discharge cycles of the positive electrodes from Experiment 2 compared to positive electrodes with a catalyst in a third half-cell experiment according to Experiment 3.

This positive electrode was also used for the same half-cell experiments—as described in Experiment 1. FIG. 5 shows the capacity as a function of the number of charge and discharge cycles for the positive electrodes without catalyst from Experiment 1 and for the positive electrodes with catalyst. FIG. 5 shows that a better capacity yield can be achieved if $V_2O_5$ is used as a catalyst in the positive electrode. On average, higher capacities of 300 mAh-400 mAh/g of carbon are obtained for positive electrodes with catalyst.

Experiment 4

In a fourth half-cell experiment, the impact of the thickness of the positive electrode and its loading with carbon per $cm^2$ of electrode surface on the capacity were examined. Table 1 shows the thickness and loading of the positive electrodes used for half-cell experiment 4 and the capacities obtained in half-cell experiment 4.

Figure 6:
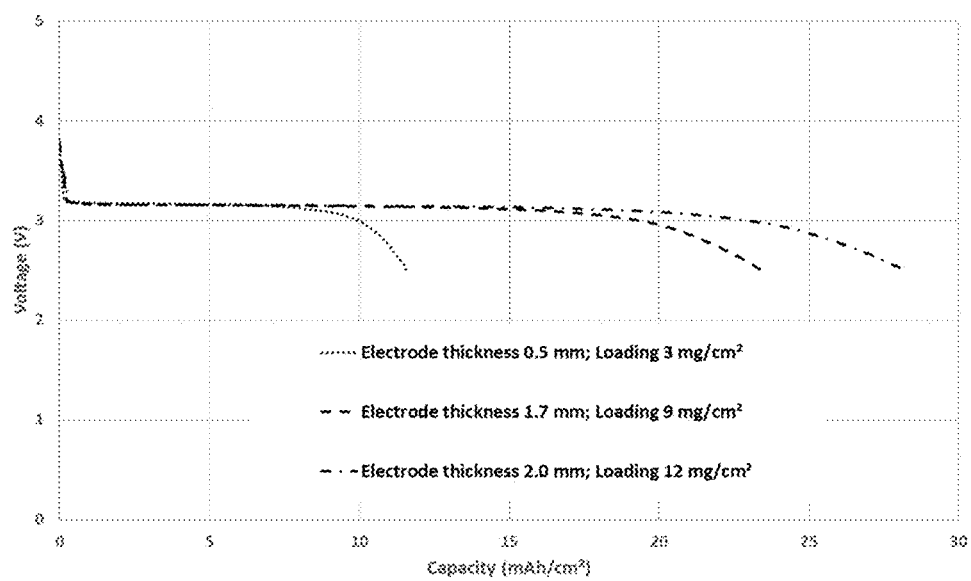
FIG. 6 shows the discharge curves of positive electrodes with different thicknesses and charges in a fourth half-cell experiment according to Experiment 4.

The positive electrode 1 was produced as described in Example 1. For the positive electrodes 2 and 3, a thicker metal foam and 18 weight % of a fluorinated and 2 weight % of a carboxyalkylcellulose-based binder were used. These positive electrodes 1, 2 and 3 were discharged at a discharge rate of C/5, starting at a voltage of 3.85 volts up to a final discharge voltage of 2.5 volts. In order to facilitate comparison, the capacities were standardized to an electrode surface area of 1 $cm^2$. FIG. 6 shows the results of the different positive electrodes 1, 2 and 3. In addition, Table 1 lists the capacities achieved in $mAh/cm^2$.

TABLE 1

Characteristics of the positive electrodes used

| Positive electrode | Thickness [mm] | Loading [mg/cm$^2$] | Capacity [mAh/cm$^2$] |
| --- | --- | --- | --- |
| 1 | 0.5 | 3 | 11.5 |
| 2 | 1.7 | 9 | 23.4 |
| 3 | 2.0 | 12 | 28.2 |

The thin positive electrode 1 with low loading shows a capacity of 11.5 $mAh/cm^2$. By increasing the thickness and loading, as in the case of electrodes 2 and 3, significantly higher capacity values are obtained.

Experiment 5

In a fifth half-cell experiment, the impact of the porosity of the positive electrode on the capacity was investigated. Table 2 shows the thickness and loading of the positive electrodes used for this half-cell experiment and the capacities obtained. In Table 2, Electrode 3 is the electrode 3 from experiment 4.

TABLE 2

Characteristics of the positive electrodes used

| Electrode | Thickness [mm] | Loading [mg/cm$^2$] | Capacity [mAh/g-carbon] |
|---|---|---|---|
| 3 | 2.0 | 12 | 2348 |
| 4 | 4.0 | 12 | 3398 |

For the positive electrodes 3 and 4, metal foams of different thicknesses were filled with the same amount of carbon per cm$^2$. For the production of electrode 3, 18 weight % of a fluorinated and 2 weight % of a carboxyalkylcellulose-based binder were used. Electrode 4 was fabricated with 10 weight % of a carboxyalkylcellulose-based binder. Electrodes of different porosity were obtained by using metal foams of different thicknesses with the same loading of 12 mg/cm$^2$. The thicker electrode 4 shows a higher porosity compared to the thinner electrode 3. These positive electrodes 3 and 4 were discharged at a discharge rate of C/5, starting at a voltage of 3.85 volts up to a final discharge voltage of 2.5 volts, see FIG. 7.

Figure 7:
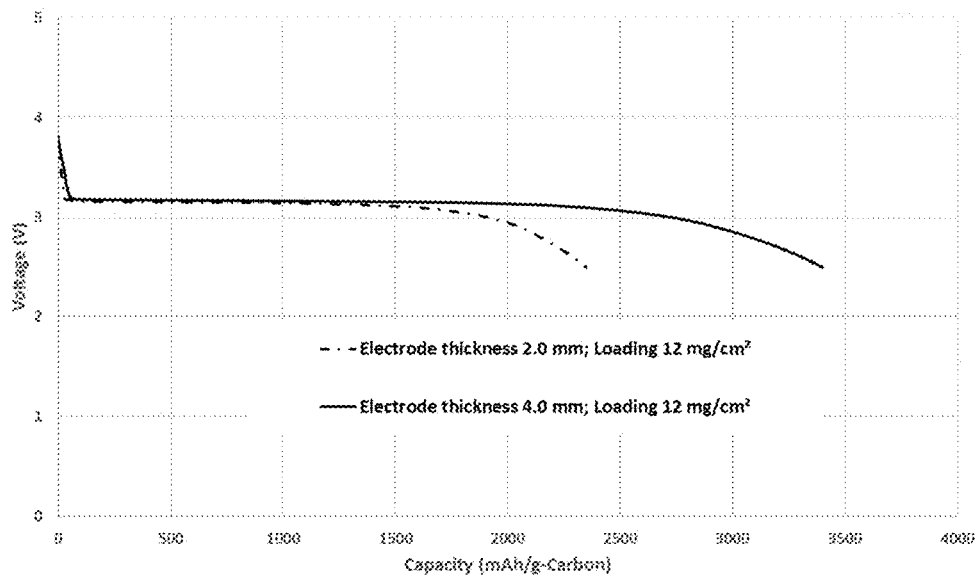
FIG. 7 shows the discharge curves of positive electrodes in a fifth half-cell experiment according to Experiment 5.

FIG. 7 shows that an increase in thickness with a constant load results in a substantial increase in capacity values. The use of a metal foam or other highly porous conducting element with a three-dimensional porous metal structure, appears to be responsible for achieving an increase in capacity at a constant loading. On the one hand, such three-dimensional porous metal structures allow for the production of thick positive electrodes with sufficient electronic contact to the external electric circuit. On the other hand, a high porosity is achieved, which gives the active electrode in such SO$_2$ depolarizer battery cells a substantial amount of space to react and form discharge products.

Experiment 6

Figure 8:
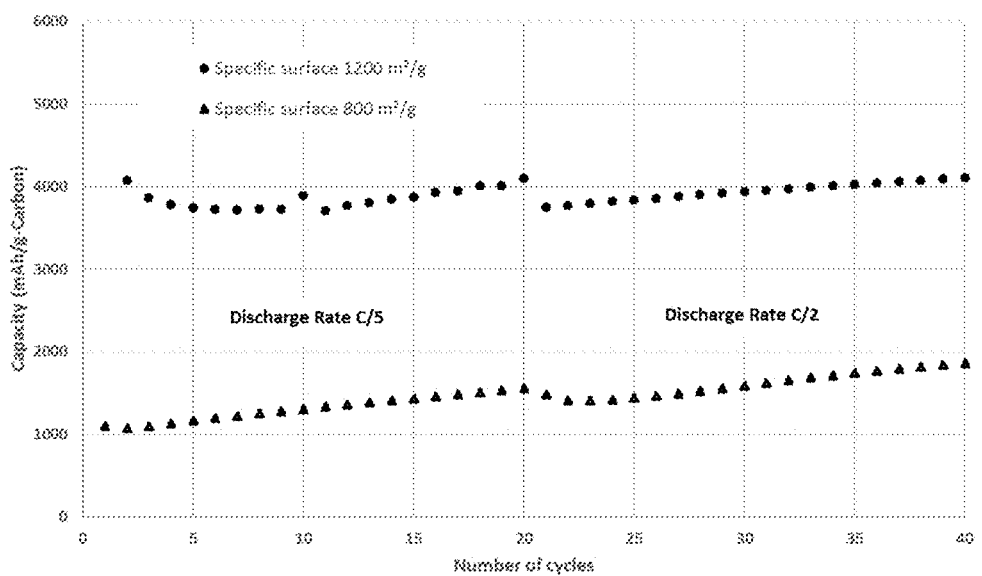
FIG. 8 shows the discharge capacity as a function of the specific surface of the carbon used for the positive electrodes in a sixth half-cell experiment based on Experiment 6.

To investigate the influence of the specific surface area of the carbon used, two different positive electrodes were produced as described in Example 1. Carbon with a specific surface area of 800 m$^2$/g or 1200 m$^2$/g was used in each case. In a half-cell experiment, the respective capacity was determined for each positive electrode as a function of the number of charge and discharge cycles (see, FIG. 8). The half-cells were formed using a charge/discharge rate of C/10. The formation cycles are not shown. The half-cells were first discharged at a C/5 discharge rate for 20 cycles, followed by another 20 cycles at a C/2 discharge rate. As seen in FIG. 8, the capacity of the positive electrode with the larger specific surface area of 1200 m$^2$/g is significantly higher than the positive electrode with the smaller specific surface area of 800 m$^2$/g.

Experiment 7

In another half-cell experiment, the attainable capacities were examined in relation to the SO$_2$ content used in the SO$_2$-based electrolyte. Five different LiAlCl$_4$*x SO$_2$-based electrolytes were produced. The x values were 1.0, 1.5, 2.0, 2.5 and 3.0. The electrolytes used in Experiment 7 and the capacities achieved are summarized in Table 3.

TABLE 3

Electrolytes used in Experiment 7

| No. | Electrolyte | Capacity [mAh/g-carbon] |
|---|---|---|
| 1 | LiAlCl$_4$ * 1.0 SO$_2$ | 3095 |
| 2 | LiAlCl$_4$ * 1.5 SO$_2$ | 4070 |
| 3 | LiAlCl$_4$ * 2.0 SO$_2$ | 4475 |
| 4 | LiAlCl$_4$ * 2.5 SO$_2$ | 3735 |
| 5 | LiAlCl$_4$ * 3.0 SO$_2$ | 1950 |

Figure 9:
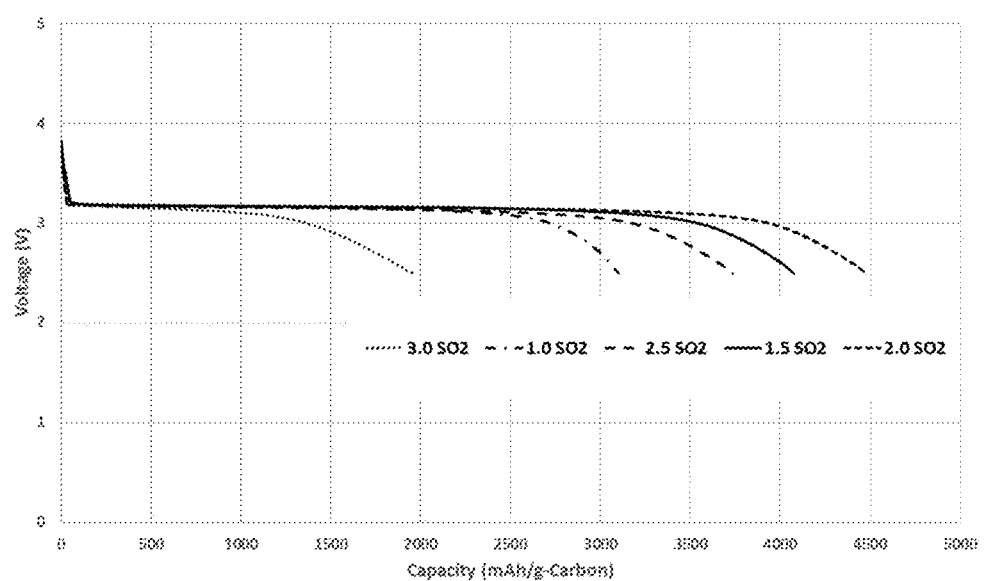
FIG. 9 shows the discharge curves for electrolytes with different $SO_2$-concentrations in a seventh half-cell experiment based on Experiment 7.

In a half-cell experiment, a positive electrode produced on the basis of Example 1 was discharged in the respective electrolyte at a discharge rate of C/5 starting at a voltage of 3.85 volts up to a final discharge voltage of 2.5 volts. FIG. 9 shows the discharge curves obtained. As mentioned above, the capacities gained are summarized in Table 3. As seen in Table 3 and FIG. 9, the optimum concentration for a battery as described is between 1.5 and 2.5 mol SO$_2$ per mol conductive salt, i.e., about 2.0 mol SO$_2$ per mol conductive salt. At this SO$_2$ concentration, capacities of almost 4500 mAh/g carbon are obtained. Reducing the sulfur dioxide content from 2.0 to 1.5 mol SO$_2$ per mol conductive salt or increasing the sulfur dioxide content from 2.0 to 2.5 mol SO$_2$ per mol conductive salt leads to lower capacity values.

Experiment 8

In an eighth half-cell experiment, the effect of an additive that was incorporated into the SO$_2$-based electrolyte was analyzed. AlCl$_3$ was used as an additive. An LiAlCl4*1.5 SO$_2$-based electrolyte was produced. AlCl$_3$ in concentrations of 4 wt %, 8 wt % and 12 wt % based on the total weight of the electrolyte was added to three samples of this electrolyte. In this half-cell experiment, a positive electrode produced on the basis of Example 1 was discharged in the respective electrolyte at a discharge rate of C/10, starting at a voltage of 3.85 volts up to a final discharge voltage of 2.5 volts. Two discharge cycles were conducted. The capacities obtained for the respective electrolytes for discharge cycles 1 and 2 are presented in Table 4.

TABLE 4

Electrolytes used in Experiment 8

| No. | Electrolyte LiAlCl$_4$ * 1.5 SO$_2$ with x wt % AlCl$_3$ | Capacity [mAh/g carbon] 1st discharge cycle | Capacity [mAh/g carbon] 2nd discharge cycle |
|---|---|---|---|
| 1 | x = 4 | 11300 | 6250 |
| 2 | x = 8 | 12035 | 8370 |
| 3 | x = 12 | 33975 | 13475 |

As illustrated in Table 4, the higher the concentration of AlCl$_3$, the higher the discharge capacity that can be obtained. In the first cycle, a capacity of approximately 34000 mAh/g carbon is achieved at a concentration of 12 wt % AlCl$_3$. In this case, almost seven times higher capacity values can be reached in the first cycle compared to Experiment 2 described above. Here, a capacity of 6500 mAh/g carbon was achieved at a discharge rate of C/10 and an electrolyte without additive. Even in a second discharge cycle it was possible to achieve a capacity that was twice as high.

Aspects of the Disclosure

The following aspects of the disclosure are illustrative of the various aspects and embodiments disclosed herein.

1. A rechargeable battery cell comprising a housing, at least one positive electrode comprising carbon, at least one negative electrode and an electrolyte comprising $SO_2$ and a conductive salt, wherein
   when the battery is discharged, the $SO_2$ in the electrolyte, and optionally one or more other components of the electrolyte, undergoes a reduction reaction, which in turn leads to one or more reactions in which one or more discharge products are formed and deposited at the positive electrode, and wherein
   the positive electrode has a thickness of at least 0.2 mm.

2. A rechargeable battery cell comprising a housing, at least one positive electrode comprising carbon, at least one negative electrode and an electrolyte comprising $SO_2$ and a conductive salt, wherein
   when the battery is discharged, the $SO_2$ in the electrolyte, and optionally one or more other components of the electrolyte, undergoes a reduction reaction, which in turn leads to one or more reactions in which one or more discharge products are formed and deposited at the positive electrode, and wherein
   the positive electrode comprises at least one further component that catalyzes at least one reduction reaction at the cathode upon discharge.

3. A rechargeable battery cell according to Aspect 2, wherein the at least one further component comprises a chemical element selected from the group consisting of vanadium, nickel, copper, magnesium, manganese, titanium, aluminum, lead, palladium, tungsten, chromium, and combinations thereof, and wherein the chemical element is present in a concentration of 1 to 20% by weight, preferably 5 to 15% by weight relative to the total weight of the carbon of the electrode.

4. A rechargeable battery cell comprising a housing, at least one positive electrode comprising carbon, at least one negative electrode and an electrolyte comprising $SO_2$ and a conductive salt, wherein
   when the battery is discharged, the $SO_2$ in the electrolyte, and optionally one or more other components of the electrolyte, undergoes a reduction reaction, which in turn leads to one or more reactions in which one or more discharge products are formed and deposited at the positive electrode, and wherein
   the positive electrode comprises a conducting element having a three-dimensional porous metal structure having a width that extends over at least 50% of the thickness of the positive electrode.

5. A rechargeable battery cell according to any of aspects 1-4, wherein the positive electrode has a thickness selected from the group consisting of at least 0.4 mm, at least 0.6 mm, at least 0.8 mm, at least 1.0 mm, at least 1.5 mm, at least 2.0 mm, and at least 4.0 mm.

6. A rechargeable battery cell according to any of aspects 1-5, wherein the positive electrode comprises a three-dimensional porous metal foam having a thickness selected from the group consisting of at least 70% of the thickness of the positive electrode, at least 80% of the thickness of the positive electrode, and at least 90% of the thickness of the positive electrode.

7. A rechargeable battery cell according to any of aspects 1-6, wherein the positive electrode comprises a metal oxide that catalyzes at least one reduction reaction at the cathode upon discharge, and wherein the metal oxide comprises a metal selected from the group consisting of vanadium, nickel, copper, magnesium, manganese, titanium, aluminum, lead, palladium, tungsten, chromium, and combinations thereof 8. A rechargeable battery cell according to any of aspects 1-7, wherein the positive electrode comprises a metal oxide that catalyzes at least one reduction reaction at the cathode upon discharge, and wherein the metal oxide is present in an amount of from 1 to 20% by weight of the weight of the carbon in electrode.

9. A rechargeable battery cell according to any of aspects 1-8, wherein the positive electrode comprises a metal oxide that catalyzes at least one reduction reaction at the cathode upon discharge, and wherein the metal oxide, and wherein the metal oxide is present in a concentration of from 5 to 15% by weight of the weight of the carbon of the electrode.

10. A rechargeable battery cell according to any of aspects 1-9, wherein the positive electrode comprises a conducting element having a three-dimensional porous metal structure, and wherein carbon is substantially homogeneously distributed within the porous metal structure.

11. A rechargeable battery cell according to any of aspects 1-10, wherein the positive electrode comprises a conducting element having a three-dimensional porous metal structure, and wherein the positive electrode comprises an amount of carbon, based on the surface area of the positive electrode, selected from the group consisting of at least 2 $mg/cm^2$, at least 5 $mg/cm^2$, at least 10 $mg/cm^2$, at least 15 $mg/cm^2$, at least 20 $mg/cm^2$, at least 30 $mg/cm^2$, and at least 50 $mg/cm^2$.

12. A rechargeable battery cell according to any of aspects 1-11, wherein the positive electrode comprises a conducting element having a three-dimensional porous metal structure, and wherein the porosity of the positive electrode is selected from the group consisting of at least 50%, at least 60%, at least 70%, at least 80%, at least 90%, at least 95% and at least 97%.

13. A rechargeable battery cell according to any of aspects 1-12, wherein the positive electrode further comprises a binder, wherein the binder is selected from the group consisting of a fluorinated binder, a fluorinated binder comprising polyvinylidene fluoride, a fluorinated binder comprising a terpolymer comprising tetrafluoroethylene, hexafluoropropylene and vinylidene fluoride, a binder comprising a polymer comprising monomeric structural units of a conjugated carboxylic acid, a binder comprising a polymer comprising monomeric structural units of an alkali metal, alkaline earth metal or ammonium salt of a conjugated carboxylic acid, a binder comprising a polymer based on monomeric styrene and butadiene structural units, a binder comprising a carboxymethylcelluloses, and combinations of two or more of the foregoing binders, and
    wherein the binder is present in a maximum concentration by the total weight of the electrode selected from the group consisting of not greater than 20% by weight, not greater than 15% by weight, not greater than 10% by weight, not greater than 7% by weight, not greater than 5% by weight, and not greater than 2% by weight.

14. A rechargeable battery cell according to any of aspects 1-13, wherein the $SO_2$-based electrolyte comprises a conductive salt of alkali metal or an alkaline earth metal selected from the group consisting of an aluminate, a halide, an oxalate, a borate, a phosphate, an arsenate, a gallate, and combinations of two or more of the foregoing.

15. A rechargeable battery cell according to aspect 14, wherein the conductive salt comprises lithium.

16. A rechargeable battery cell according to aspect 15, wherein the conductive salt is a lithium tetrachloroaluminate.

17. A rechargeable battery cell according to any of aspects 1-16, wherein the $SO_2$-based electrolyte comprises a concentration of $SO_2$ per mole of conductive salt selected from the group consisting of from 0.5 to 20 mol $SO_2$ per mol conductive salt, from 0.5 to 8.0 mol $SO_2$ per mol conductive salt, from 1.0 to 6.0 mol $SO_2$ per mol conductive salt, from 1.0 to 5.0 mol $SO_2$ per mol conductive salt, from 1.5 to 5.0 mol $SO_2$ per mol conductive salt, from 2.0 mol to 5.0 mol $SO_2$ per mol conductive salt, from 2.0 to 4.0 mol $SO_2$ per mol conductive salt, 1.5 to 2.5 mol $SO_2$ per mol conductive salt, 1.75 to 2.25 mol $SO_2$ per mol conductive salt, 2.0 to 3.0 mol $SO_2$ per mol conductive salt, and about 2.0 mol $SO_2$ per mol conductive salt.

18. A rechargeable battery cell according to any of aspects 1-17, wherein the $SO_2$-based electrolyte further comprises an alkali metal halide or alkaline earth metal halide or a halide of groups 11, 12 or 13 of the periodic table of elements.

19. A rechargeable battery cell according to any of aspects 1-18, wherein the $SO_2$-based electrolyte further comprises $AlCl_3$.

20. A rechargeable battery cell according to any of aspects 1-19, wherein the negative electrode comprises an active metal selected from the group consisting of an alkali metal, an alkaline earth metal, a metal of group 12 of the periodic table of elements, aluminum and a combination of two or more of the foregoing.

21. A rechargeable battery cell according to any of aspects 1-20, wherein the negative electrode comprises an active metal selected from the group consisting of is lithium, sodium, calcium, zinc, aluminum, and a combination of two or more of the foregoing.

22. A rechargeable battery cell according to any of aspects 1-21, wherein the negative electrode comprises an active metal selected from the group consisting of lithium, sodium, calcium, zinc, aluminum, and a combination of two or more of the foregoing, and wherein the negative electrode comprises an amount of active metal, based on its surface area, selected from the group consisting of at least 10 mg/cm², at least 20 mg/cm², at least 40 mg/cm², at least 60 mg/cm², at least 80 mg/cm², and at least 100 mg/cm².

23. A rechargeable battery cell according to any of aspects 1-22, wherein the negative electrode comprises lithium.

24. A rechargeable battery cell according to any of aspects 1-23, wherein the negative electrode has a thickness selected from the group consisting of at least 0.05 mm, at least 0.10 mm, at least 0.50 mm, at least 1.00 mm, at least 1.50 mm, at least 2.00 mm, and at least 2.50 mm.

25. A rechargeable battery cell according to any of aspects 1-23, wherein the positive electrode comprises a metal oxide that catalyzes at least one reduction reaction at the cathode upon discharge, and wherein the metal oxide comprises a metal selected from the group consisting of vanadium, nickel, copper, magnesium, manganese, titanium, aluminum, lead, palladium, tungsten, chromium, and combinations thereof 26. A rechargeable battery cell according to any of aspects 1-25, wherein the positive electrode comprises a metal oxide that catalyzes at least one reduction reaction at the cathode upon discharge, and wherein the metal oxide is present in an amount of from 1 to 20% by weight of the weight of the carbon in electrode.

27. A rechargeable battery cell according to any of aspects 1-26, wherein the positive electrode comprises a metal oxide that catalyzes at least one reduction reaction at the cathode upon discharge, and wherein the metal oxide, and wherein the metal oxide is present in a concentration of from 5 to 15% by weight of the weight of the carbon of the electrode.

28. A rechargeable battery cell according to any of aspects 1-27, wherein the positive electrode comprises at least one metal halide.

29. A rechargeable battery cell according to aspect 28, wherein the at least one metal halide is selected from the group consisting of a metal chloride, a metal fluoride, a metal bromide, and combinations thereof 30. A rechargeable battery cell according to aspect 29, wherein the at least one metal halide comprises copper chloride.

31. A rechargeable battery cell according to any of aspects 28-30, wherein the at least one metal halide is present in an amount selected from the group consisting of 2-5%, 5-10%, 10-20%, 20-30%, 30-40%, 40-50%, 50-60%, 60-70%, 70-80%, and 80-90% relative to the total weight of the electrode.

32. A rechargeable battery cell positive electrode, wherein the electrode comprises carbon and a conducting element having a three-dimensional porous metal structure having a width that extends over at least 50% of the thickness of the positive electrode.

33. A rechargeable battery cell positive electrode according to aspect 32, wherein the electrode has a thickness selected from the group consisting of at least 0.4 mm, at least 0.6 mm, at least 0.8 mm, at least 1.0 mm, at least 1.5 mm, at least 2.0 mm, and at least 4.0 mm.

34. A rechargeable battery cell positive electrode according to any of aspects 32-33, wherein the positive electrode comprises a three-dimensional porous metal foam having a thickness selected from the group consisting of at least 70% of the thickness of the positive electrode, at least 80% of the thickness of the positive electrode, and at least 90% of the thickness of the positive electrode.

35. A rechargeable battery cell positive electrode according to any of aspects 32-34, wherein the positive electrode comprises a metal oxide that catalyzes at least one reduction reaction at the cathode upon discharge, and wherein the metal oxide comprises a metal selected from the group consisting of vanadium, nickel, copper, magnesium, manganese, titanium, aluminum, lead, palladium, tungsten, chromium, and combinations thereof.

36. A rechargeable battery cell positive electrode according to any of aspects 32-35, wherein the positive electrode comprises a metal oxide that catalyzes at least one reduction reaction at the cathode upon discharge, and wherein the metal oxide is present in an amount of from 1 to 20% by weight of the weight of the carbon in electrode.

37. A rechargeable battery cell positive electrode according to any of aspects 32-36, wherein the positive electrode comprises a metal oxide that catalyzes at least one reduction reaction at the cathode upon discharge, and wherein the metal oxide, and wherein the metal oxide is present in a concentration of from 5 to 15% by weight of the weight of the carbon of the electrode. 38. A rechargeable battery cell positive electrode according to any of aspects 32-37, wherein the positive electrode comprises a conducting element having a three-dimensional porous metal structure, and wherein carbon is substantially homogeneously distributed within at least a portion of the porous metal structure.
39. A rechargeable battery cell positive electrode according to any of aspects 32-38, wherein the positive electrode comprises a conducting element having a three-dimensional porous metal structure, and wherein the positive electrode comprises an amount of carbon, based on the surface area of the positive electrode, selected from the group consisting of at least 2 mg/cm$^2$, at least 5 mg/cm$^2$, at least 10 mg/cm$^2$, at least 15 mg/cm$^2$, at least 20 mg/cm$^2$, at least 30 mg/cm$^2$, and at least 50 mg/cm$^2$.
40. A rechargeable battery cell positive electrode according to any of aspects 32-39, wherein the positive electrode comprises a conducting element having a three-dimensional porous metal structure, and wherein the porosity of the positive electrode is selected from the group consisting of at least 10%, at least 20%, at least 30%, at least 40%, at least 50%, at least 60%, at least 70%, at least 80%, at least 90%, at least 95% and at least 97%.
41. A rechargeable battery cell positive electrode according to any of aspects 32-40, wherein the positive electrode further comprises a binder, wherein the binder is selected from the group consisting of a fluorinated binder, a binder comprising a polymer comprising monomeric structural units of a conjugated carboxylic acid, a binder comprising a polymer comprising monomeric structural units of an alkali metal, alkaline earth metal, or ammonium salt of a conjugated carboxylic acid, or combinations thereof, a binder comprising a polymer based on monomeric styrene and butadiene structural units, a binder comprising a carboxyalkylcellulose or salt thereof, and combinations of two or more of the foregoing binders.
42. A rechargeable battery cell positive electrode according to aspect 41, wherein the binder is present in a maximum concentration by the total weight of the electrode selected from the group consisting of not greater than 30% by weight, not greater than 20% by weight, not greater than 15% by weight, not greater than 10% by weight, not greater than 7% by weight, not greater than 5% by weight, and not greater than 2% by weight.
43. A rechargeable battery cell positive electrode according to any of aspects 41 or 42, wherein the binder comprises a fluorinated binder.
44. A rechargeable battery cell positive electrode according to any of aspects 41-43, wherein the binder is selected from the group consisting of a fluorinated binder comprising polyvinylidene fluoride, a fluorinated binder comprising a terpolymer comprising tetrafluoroethylene, hexafluoropropylene and vinylidene fluoride, and combinations of two or more of the foregoing binders.
45. A rechargeable battery cell positive electrode according to any of aspects 41-44, wherein the binder comprises a polymer comprising monomeric structural units of a conjugated carboxylic acid.
46. A rechargeable battery cell positive electrode according to any of aspects 41-45, wherein the a binder comprises a polymer comprising monomeric structural units of an alkali metal, alkaline earth metal or ammonium salt of a conjugated carboxylic acid.
47. A rechargeable battery cell positive electrode according to any of aspects 41-46, wherein the binder comprises a polymer based on monomeric styrene and butadiene structural units.
48. A rechargeable battery cell positive electrode according to any of aspects 41-47, wherein the binder comprises a carboxyalkylcellulose or salt thereof
49. A rechargeable battery cell positive electrode according to aspect 48, wherein the binder comprises carboxymethylcellulose or salt thereof.
50. A rechargeable battery cell positive electrode according to any of aspects 41 or 42, wherein the binder comprises a fluorinated binder and a carboxyalkylcellulose binder or salt thereof.
51. A rechargeable battery cell positive electrode according to any of aspects 41-50, wherein the positive electrode comprises at least one metal halide.
52. A rechargeable battery cell positive electrode according to aspect 51, wherein the at least one metal halide is selected from the group consisting of a metal chloride, a metal fluoride, a metal bromide, and combinations thereof.
53. A rechargeable battery cell positive electrode according to aspect 52, wherein the at least one metal halide comprises copper chloride.
54. A rechargeable battery cell according to any of aspects 51-53, wherein the at least one metal halide is present in an amount selected from the group consisting of 2-5%, 5-10%, 10-20%, 20-30%, 30-40%, 40-50%, 50-60%, 60-70%, 70-80%, and 80-90% relative to the total weight of the electrode.
55. A method of making a rechargeable battery cell positive electrode according to any of aspects 41-54, wherein the method comprises the steps of
   a. preparing a mixture comprising carbon and a binder,
   b. introducing the mixture into a porous metal conducting element, and
   c. allowing the binder to dry.
56. A method according to aspect 55, wherein the binder is dissolved in a solvent.
57. A method according to any of aspects 55-56, wherein carbon is added while mixing, optionally with the addition of one or more additional solvents.
58. A method according to any of aspects 55-57, wherein the binder forms a paste, and wherein the paste is introduced such that the carbon is substantially homogeneously distributed within at least a portion of the electrode.
59. A method according to any of aspects 55-58, further comprising the step of compressing the electrode to reduce its thickness.

DEFINITIONS

For convenience, certain terms employed in the specification and appended claims are collected here. These definitions should be read in light of the entire disclosure and understood as by a person of skill in the art.

The articles "a" and "an," as used herein in the specification and in the claims, unless clearly indicated to the contrary, should be understood to mean "at least one." In the same connection, it shall be understood for purposes of this disclosure and appended claims that, regardless of whether the phrases "one or more" or "at least one" precede an element or feature, such element or feature should be interpreted to mean "at least one" or "one or more," unless it is made explicit in the instant specification that a singular interpretation is intended for such element or feature.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The phrase "or," as used herein in the specification and in the claims, should be understood to mean "either or both" of the elements so conjoined, i.e., elements that are conjunctively present in some cases and disjunctively present in other cases. Multiple elements listed with "or" should be construed in the same fashion, i.e., "one or more" of the elements so conjoined. Other elements may optionally be present other than the elements specifically identified by the "or" clause, whether related or unrelated to those elements specifically identified. Thus, as a non-limiting example, a reference to "A or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, processes described herein and claimed below can include steps in addition to the steps recited, and the order of the steps or acts of the process is not necessarily limited to the order in which the steps or acts of the process are recited. In the context of this disclosure, the words "process" and "method" are synonymous.

In the claims, as well as in the specification, all transitional phrases such as "comprising," "comprised of," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Those skilled in the art will recognize, or be able to ascertain using no more than routine experimentation, many equivalents to the specific embodiments described herein. Such equivalents are intended to be encompassed by the following claims.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A rechargeable lithium-ion battery cell, comprising:
    a gas-tight housing;
    at least one positive electrode comprising a porous metal structure with carbon incorporated therein, wherein the positive electrode has a thickness of at least 0.2 mm and the porous metal structure comprises at least 50% of the thickness of the positive electrode, wherein the specific surface area of the carbon used to fabricate the positive electrode is at least 200 $m^2/g$, and wherein the porosity of the positive electrode is at least 50%;
    at least one negative electrode; and
    an electrolyte comprising $SO_2$ and a conductive salt;
    wherein the $SO_2$ in the electrolyte serves as an active electrode depolarizer.

2. The rechargeable battery cell of claim 1, wherein the positive electrode comprises at least one further component that catalyzes at least one reduction reaction at the cathode upon discharge.

3. The rechargeable battery cell according to claim 1, wherein the positive electrode comprises a metal oxide that catalyzes at least one reduction reaction at the cathode upon discharge, and wherein the metal oxide comprises a metal selected from the group consisting of vanadium, nickel, copper, magnesium, manganese, titanium, aluminum, lead, palladium, tungsten, chromium, and combinations thereof.

4. The rechargeable battery cell according to claim 3, wherein metal oxide is present in an amount of from 1 to 20% by weight of the weight of the carbon in electrode.

5. The rechargeable battery cell according to claim 1, wherein the electrolyte comprises a conductive salt of an alkali metal or an alkaline earth metal selected from the group consisting of an aluminate, a halide, an oxalate, a borate, a phosphate, an arsenate, a gallate, and combinations of two or more of the foregoing.

6. The rechargeable battery cell according to claim 5, wherein the conductive salt is a lithium tetrahaloaluminate.

7. The rechargeable battery cell according to claim 1, wherein the electrolyte comprises a concentration of $SO_2$ per mole of conductive salt selected from the group consisting of from 0.5 to 20 mol $SO_2$ per mol conductive salt, from 0.5 to 8.0 mol $SO_2$ per mol conductive salt, from 1.0 to 6.0 mol $SO_2$ per mol conductive salt, from 1.0 to 5.0 mol $SO_2$ per mol conductive salt, from 1.5 to 5.0 mol $SO_2$ per mol conductive salt, from 2.0 mol to 5.0 mol $SO_2$ per mol conductive salt, from 2.0 to 4.0 mol $SO_2$ per mol conductive salt, 1.5 to 2.5 mol $SO_2$ per mol conductive salt, 1.75 to 2.25 mol $SO_2$ per mol conductive salt, 2.0 to 3.0 mol $SO_2$ per mol conductive salt, and about 2.0 mol $SO_2$ per mol conductive salt.

* * * * *